June 17, 1930.   G. E. PICKUP   1,763,862
MOLDING MACHINE
Filed Sept. 24, 1926   18 Sheets-Sheet 1

Inventor:
George E. Pickup,
By Churchill, Parker & Carlson
Attys.

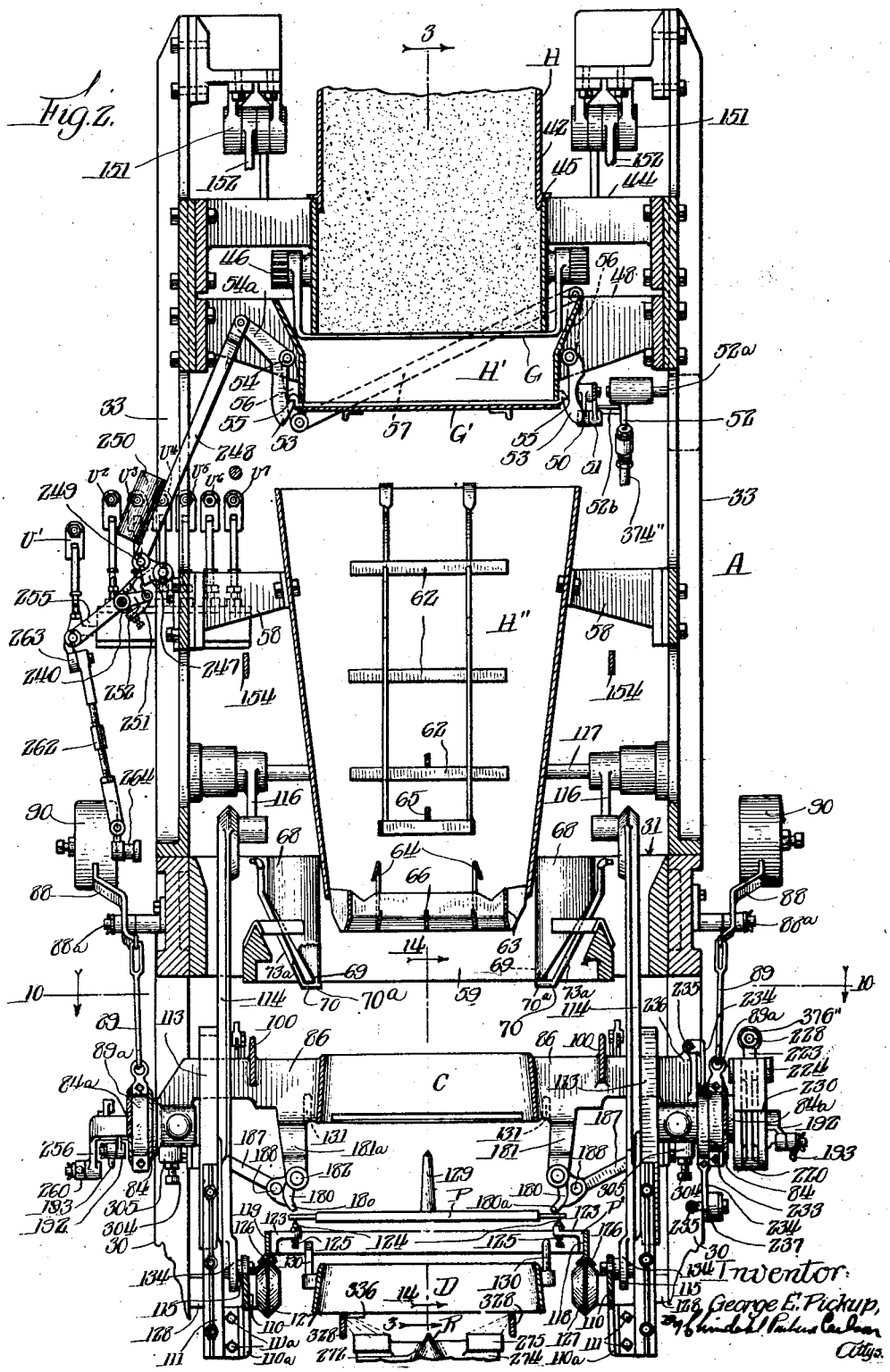

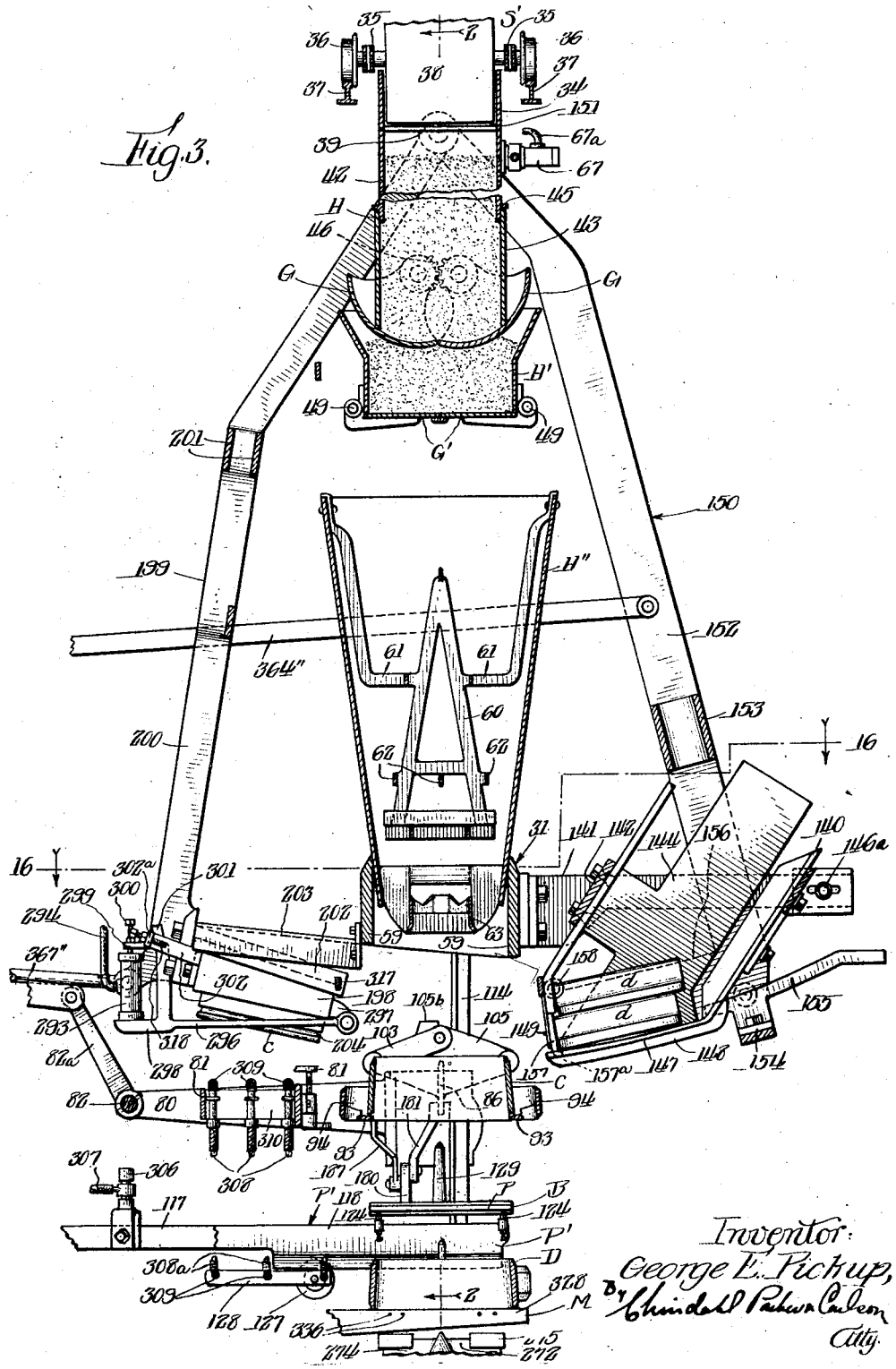

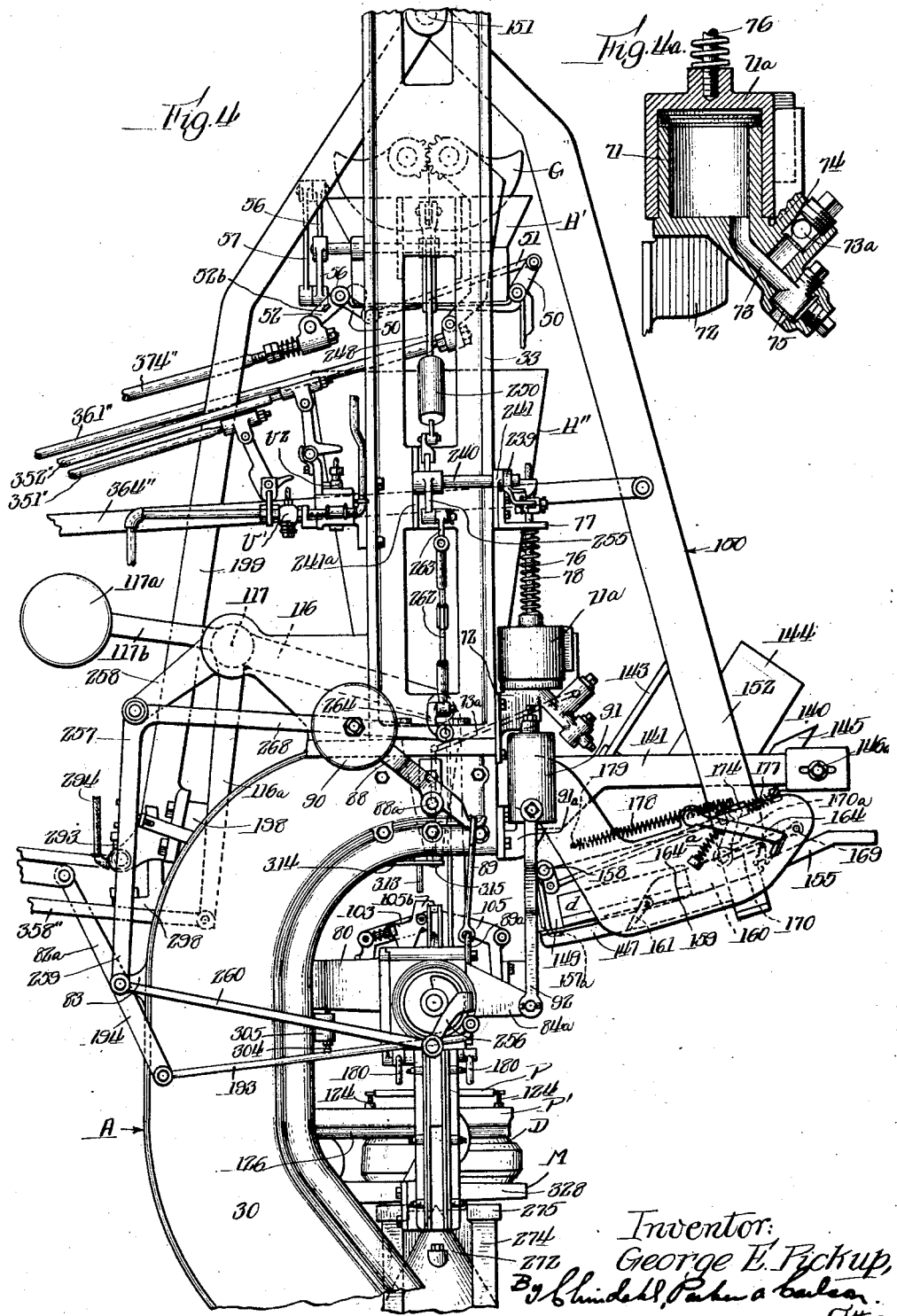

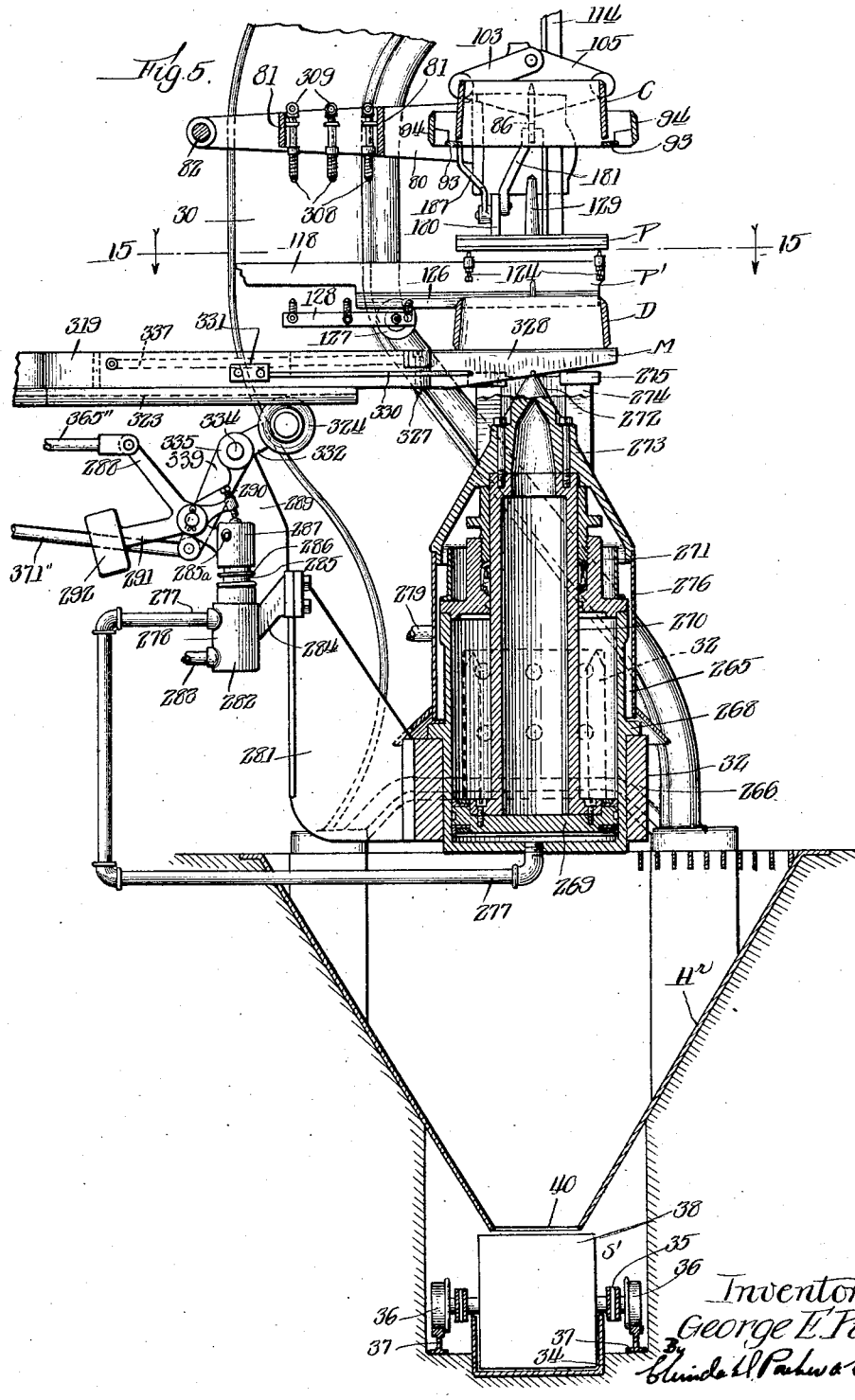

June 17, 1930. G. E. PICKUP 1,763,862
MOLDING MACHINE
Filed Sept. 24, 1926 18 Sheets-Sheet 6
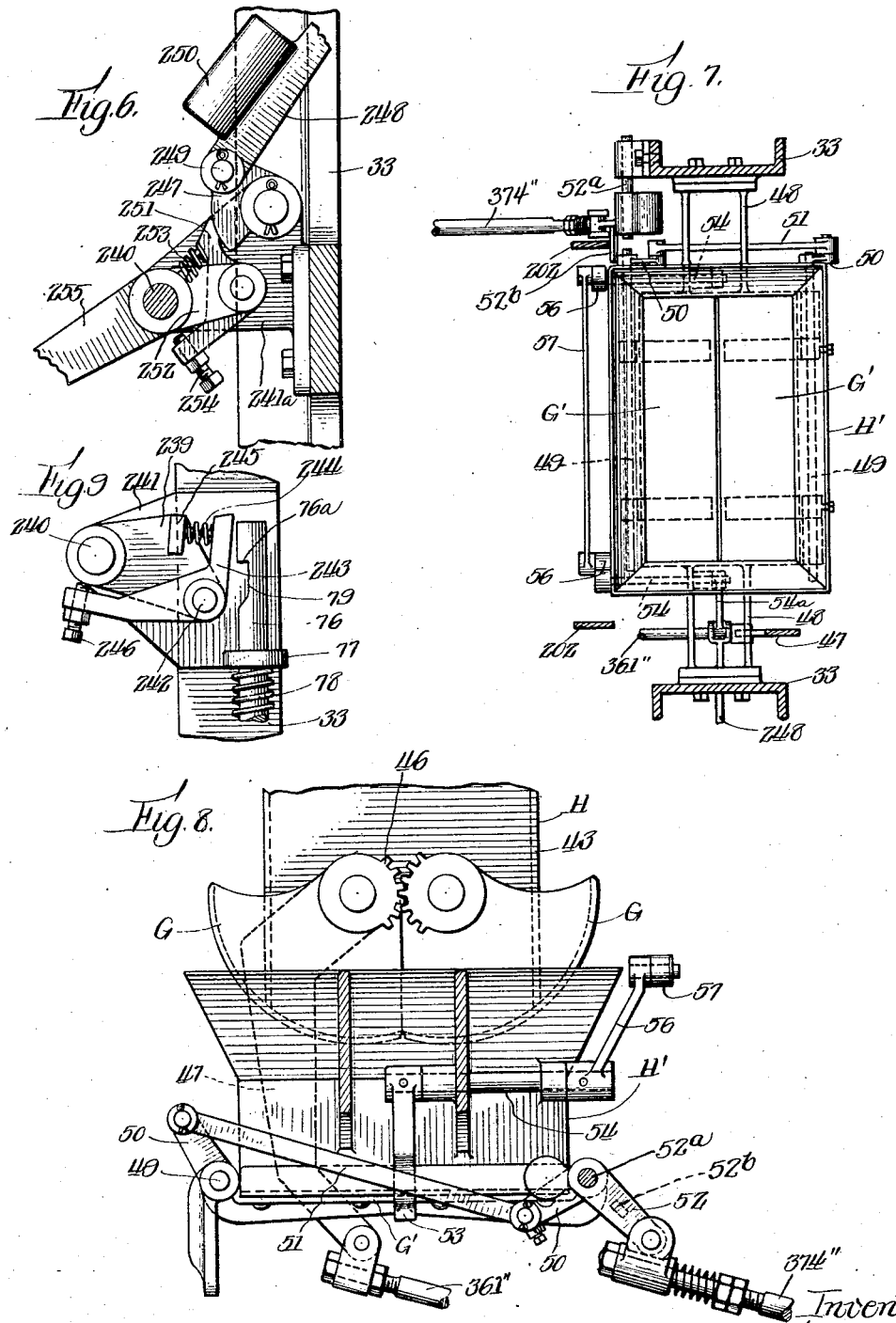

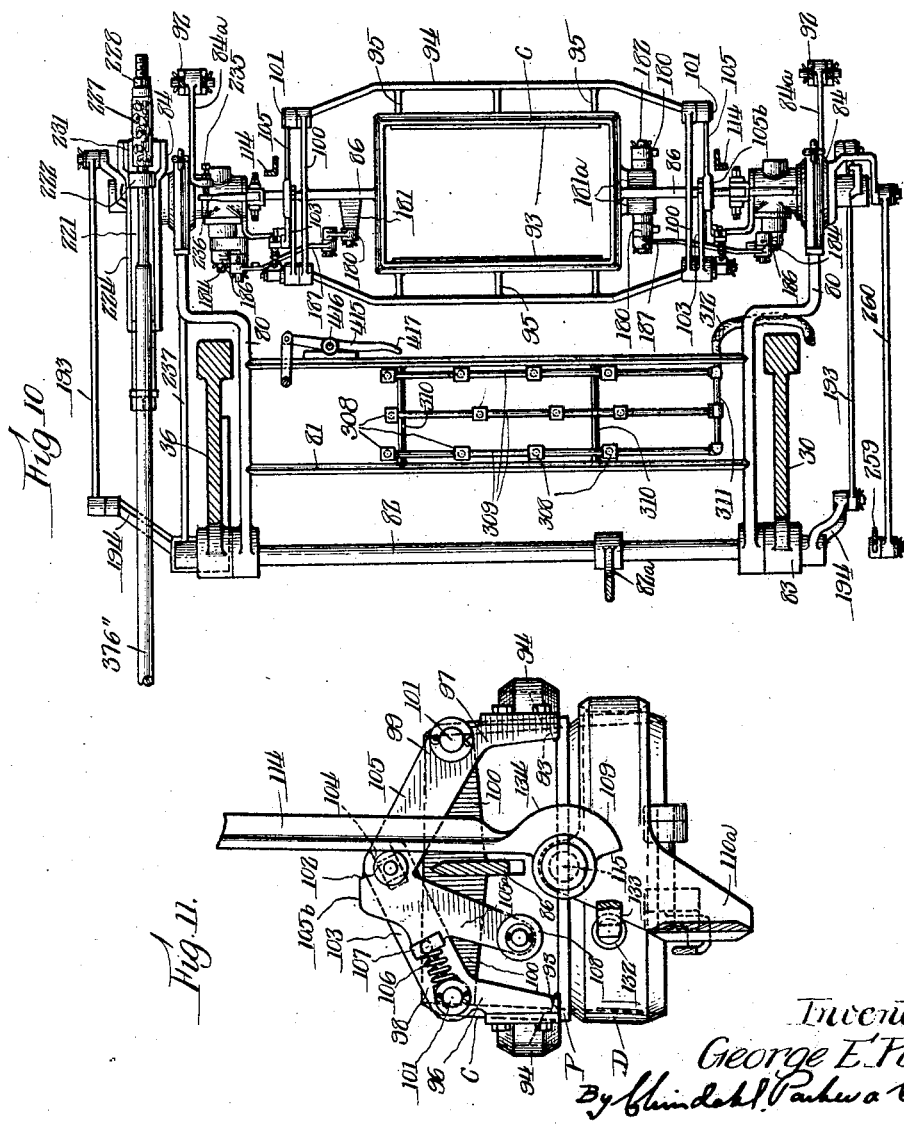

June 17, 1930.  G. E. PICKUP  1,763,862
MOLDING MACHINE
Filed Sept. 24, 1926  18 Sheets-Sheet 8
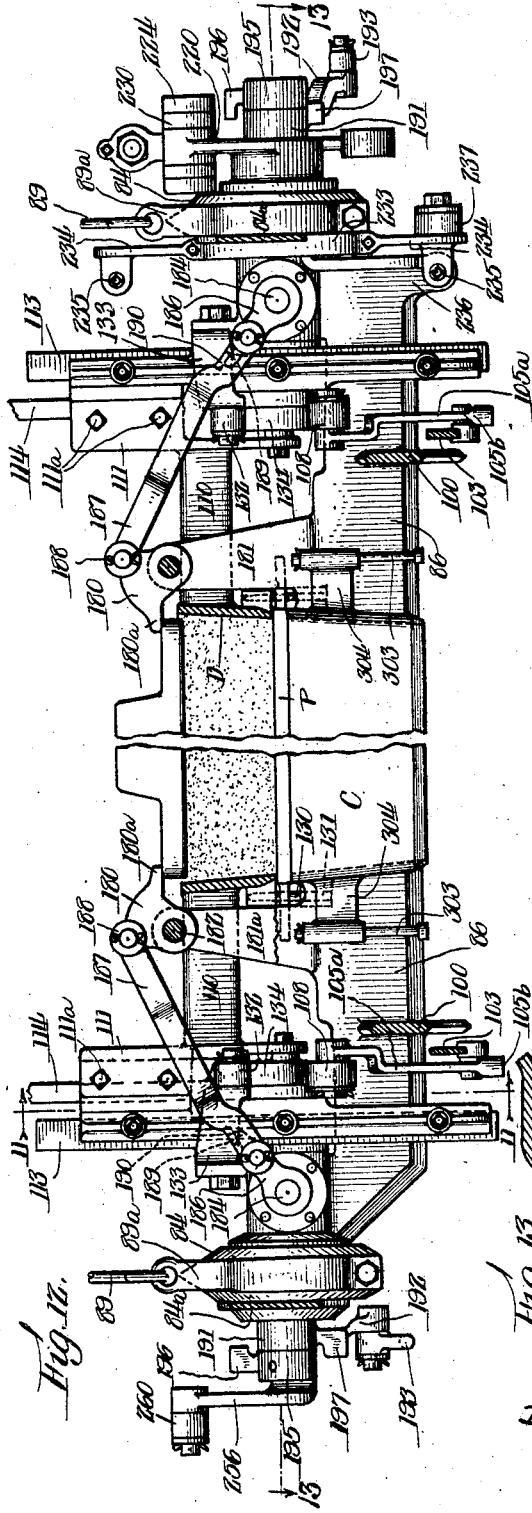
Inventor:
George E. Pickup,
Attys.

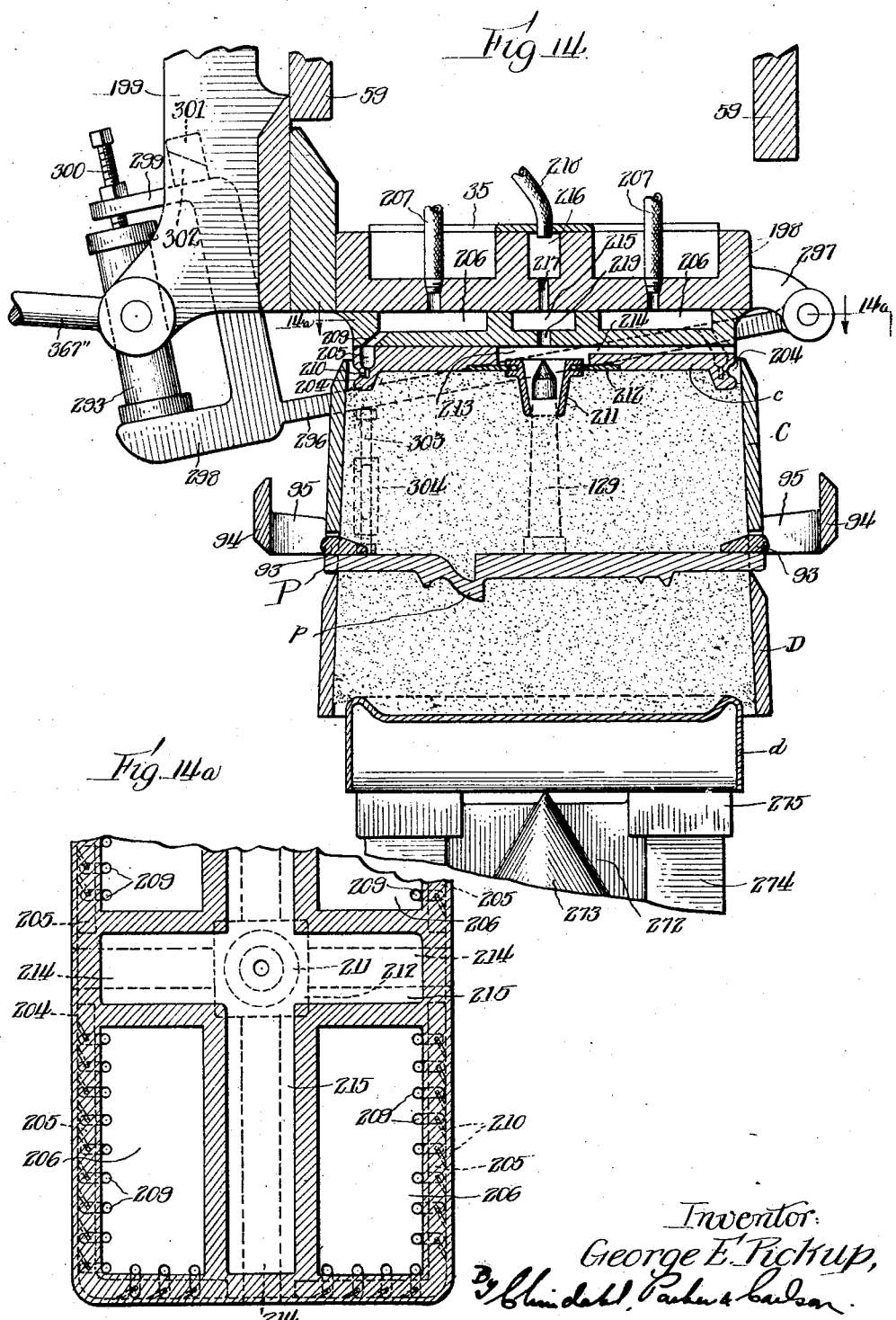

June 17, 1930. G. E. PICKUP 1,763,862
MOLDING MACHINE
Filed Sept. 24, 1926 18 Sheets-Sheet 10
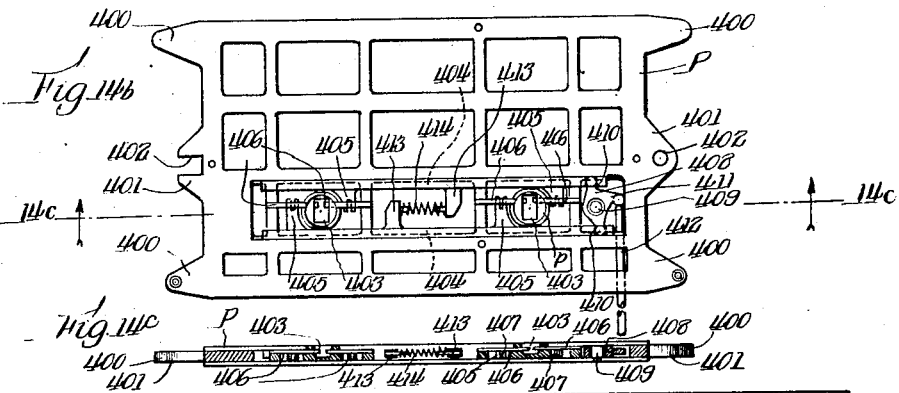
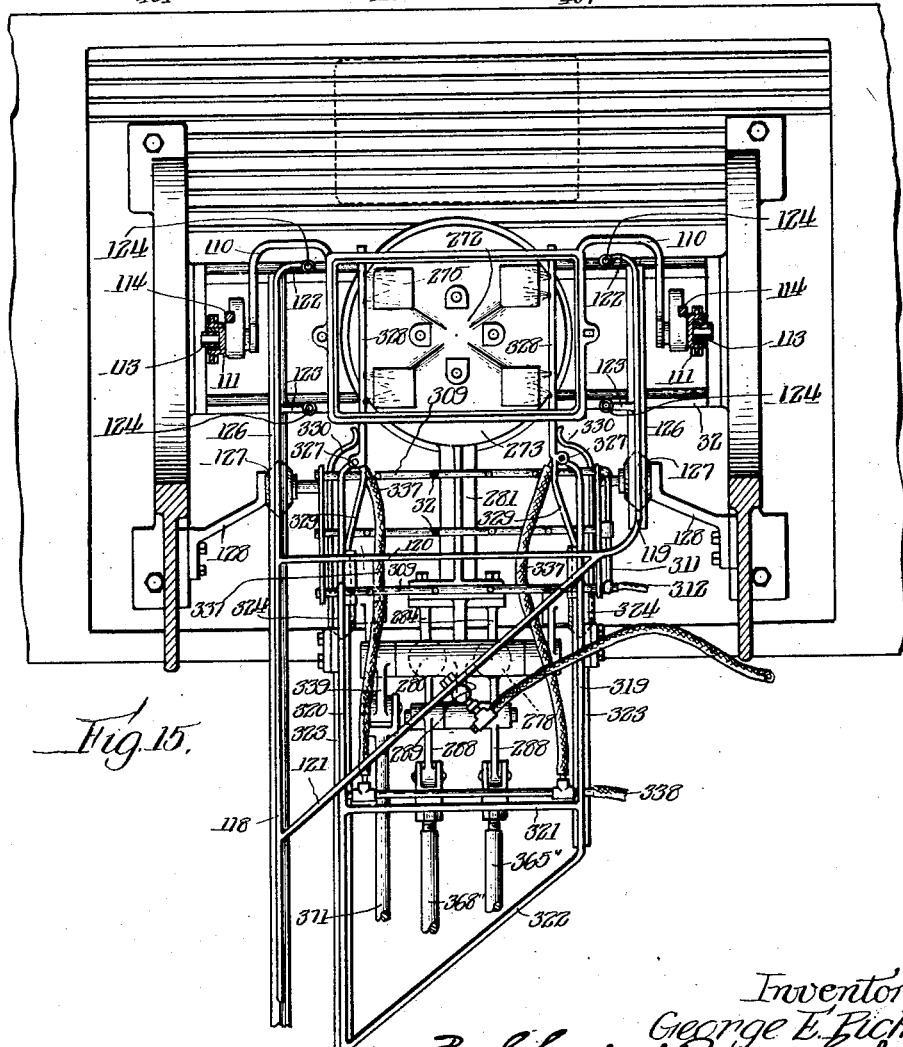

June 17, 1930.  G. E. PICKUP  1,763,862
MOLDING MACHINE
Filed Sept. 24, 1926  18 Sheets-Sheet 11

Inventor:
George E. Pickup

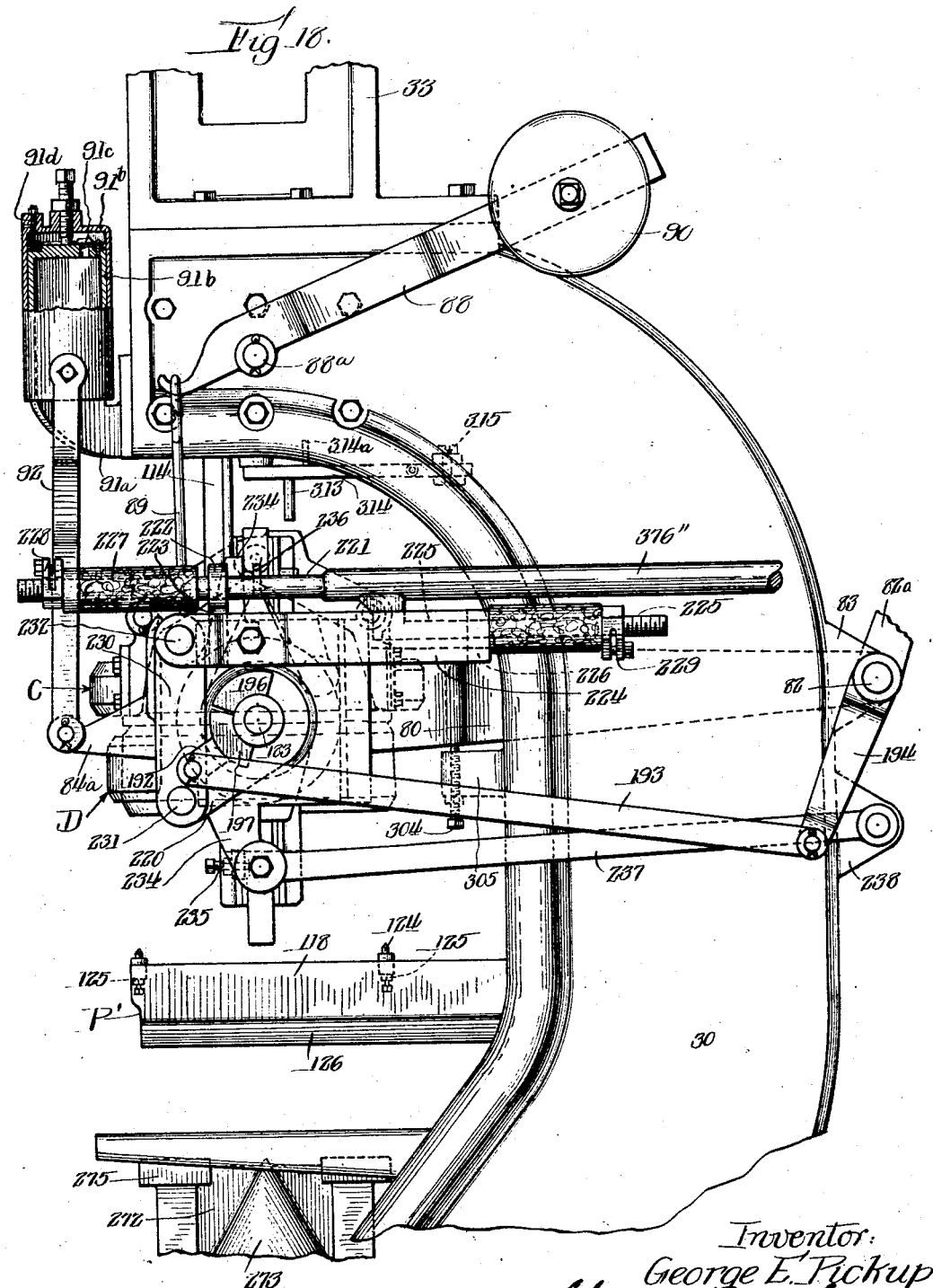

June 17, 1930.　　G. E. PICKUP　　1,763,862
MOLDING MACHINE
Filed Sept. 24, 1926　　18 Sheets-Sheet 13
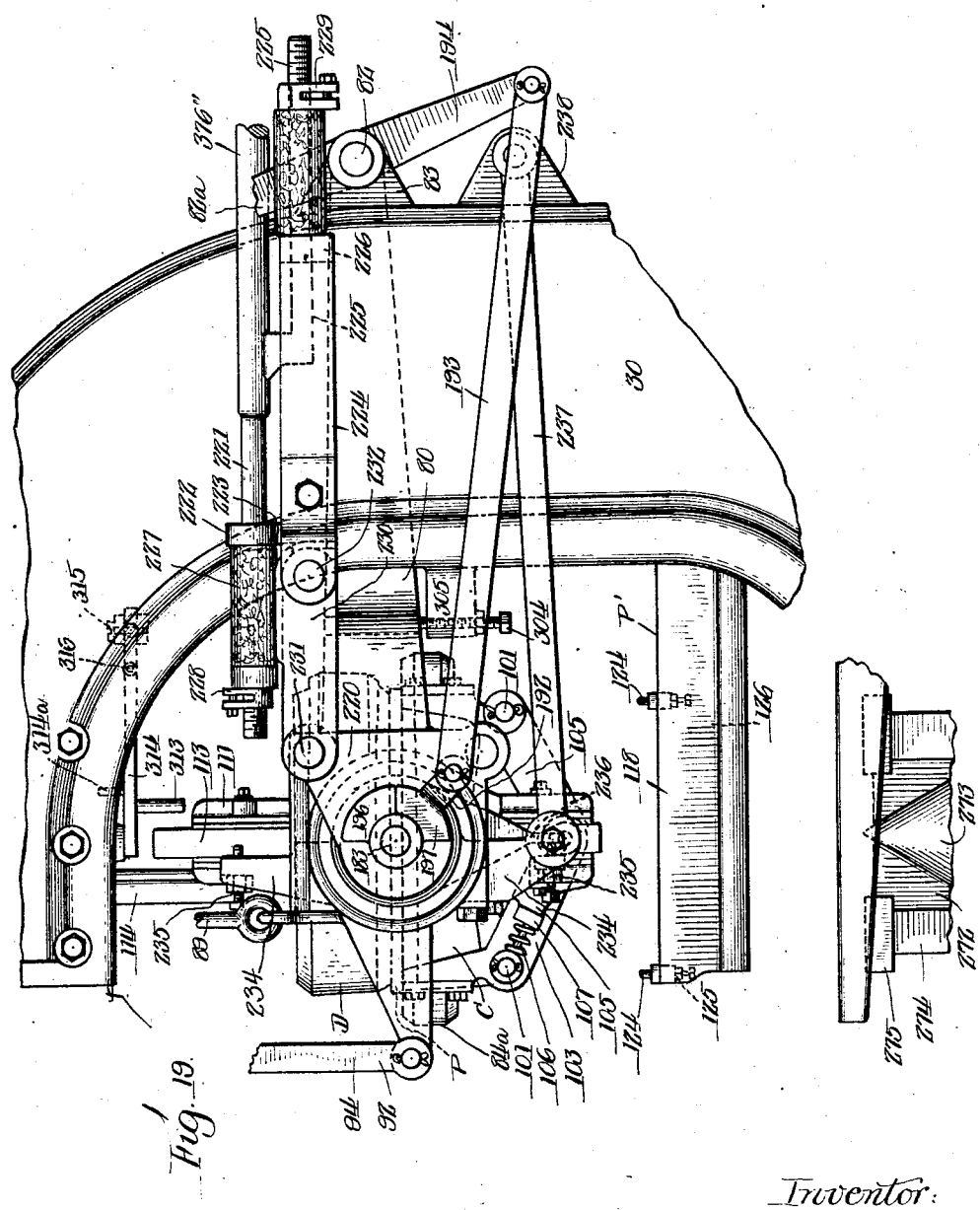
Inventor:
George E. Pickup,
By Chindahl Parker a Carlson
Attys.

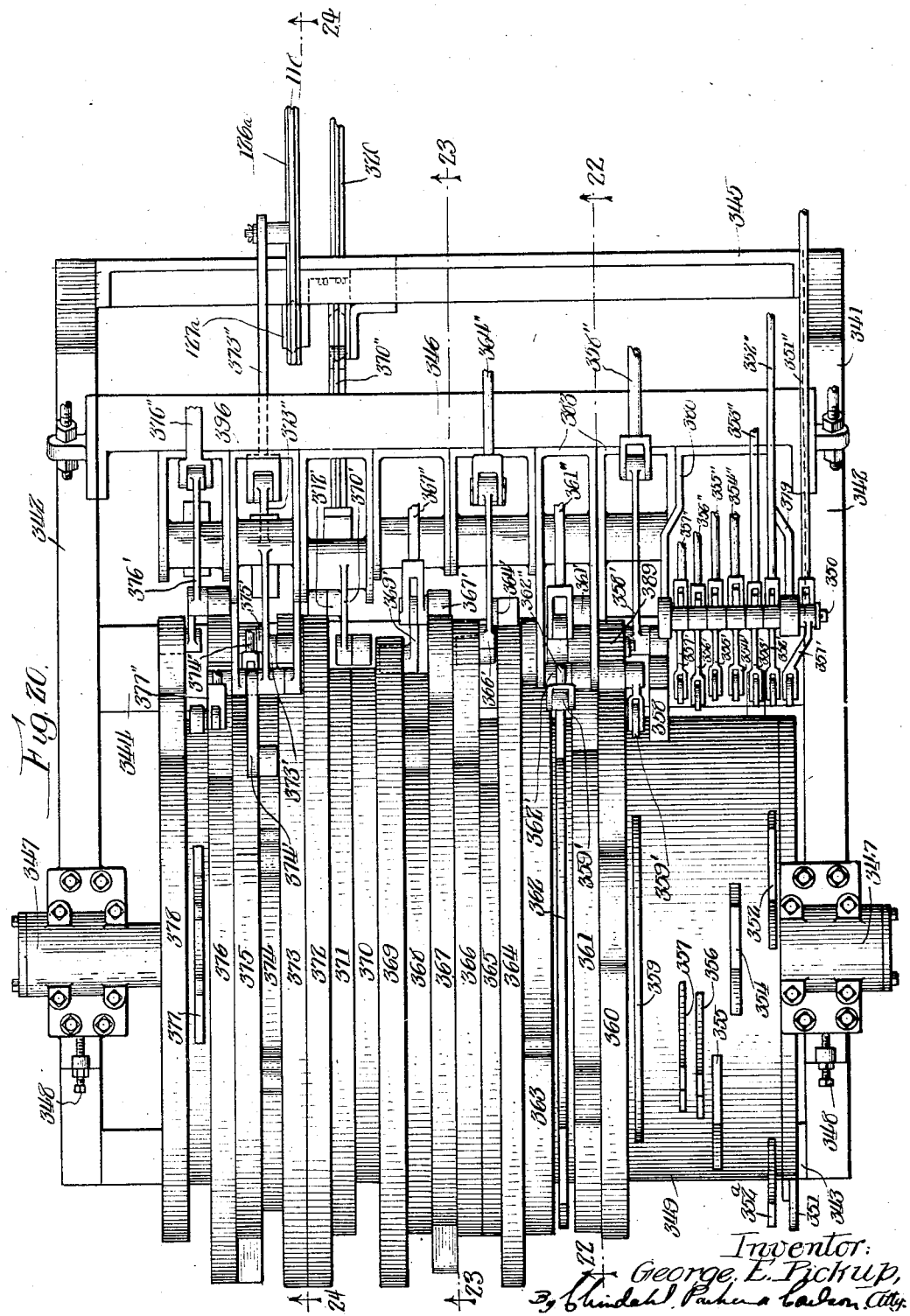

June 17, 1930.  G. E. PICKUP  1,763,862
MOLDING MACHINE
Filed Sept. 24, 1926    18 Sheets-Sheet 15
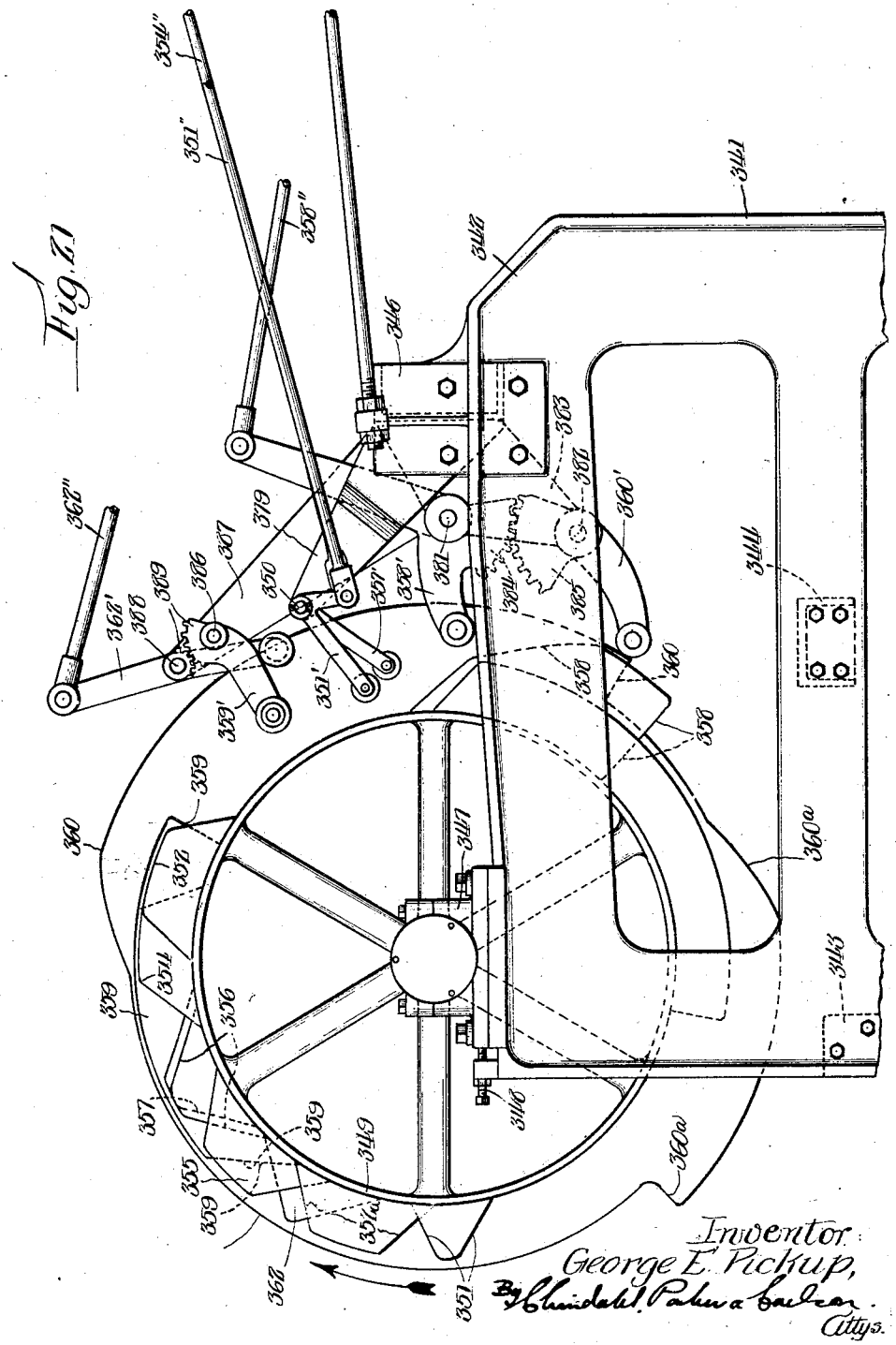
Inventor
George E. Pickup,
Attys.

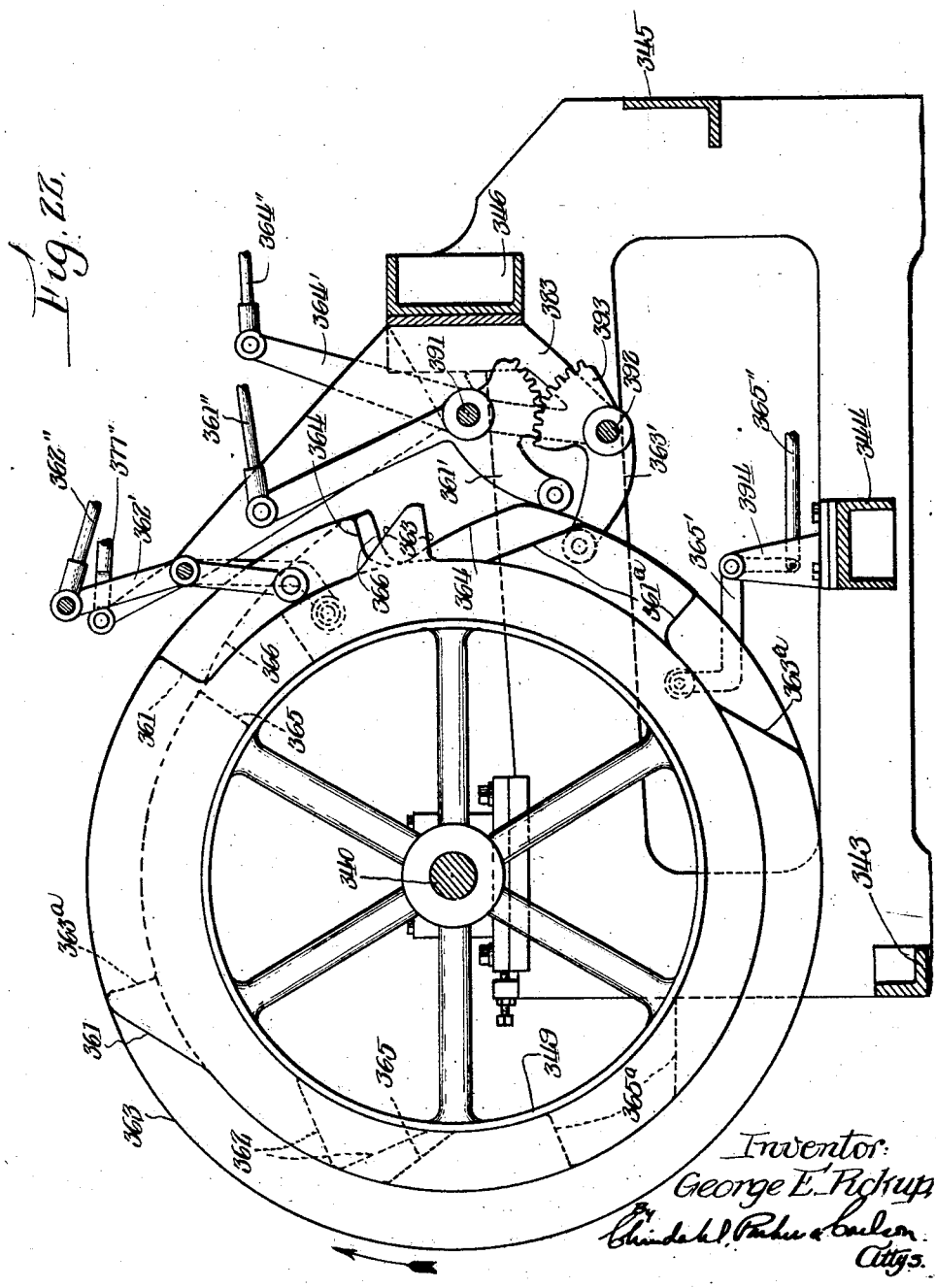

June 17, 1930. G. E. PICKUP 1,763,862
MOLDING MACHINE
Filed Sept. 24, 1926 18 Sheets-Sheet 17
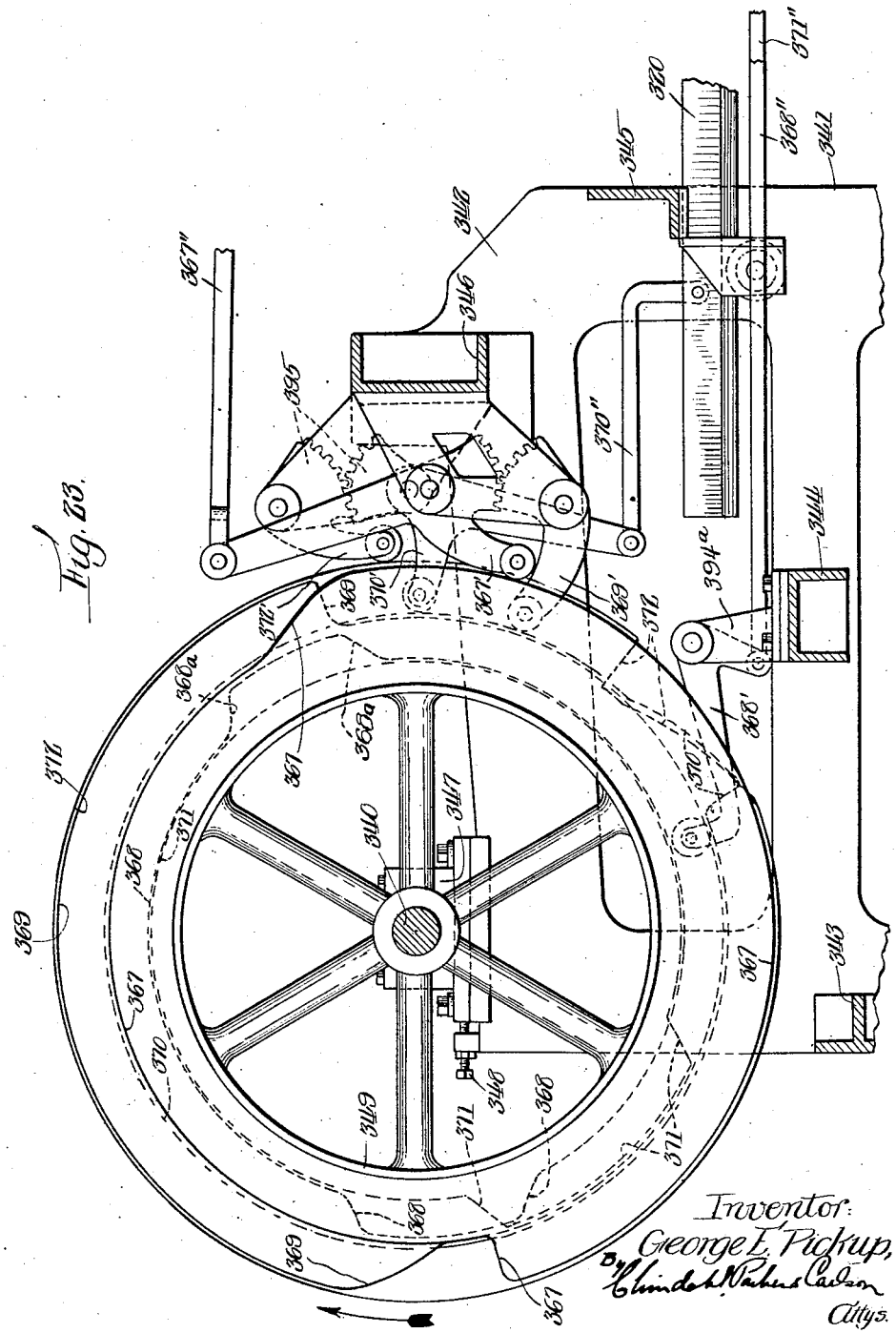

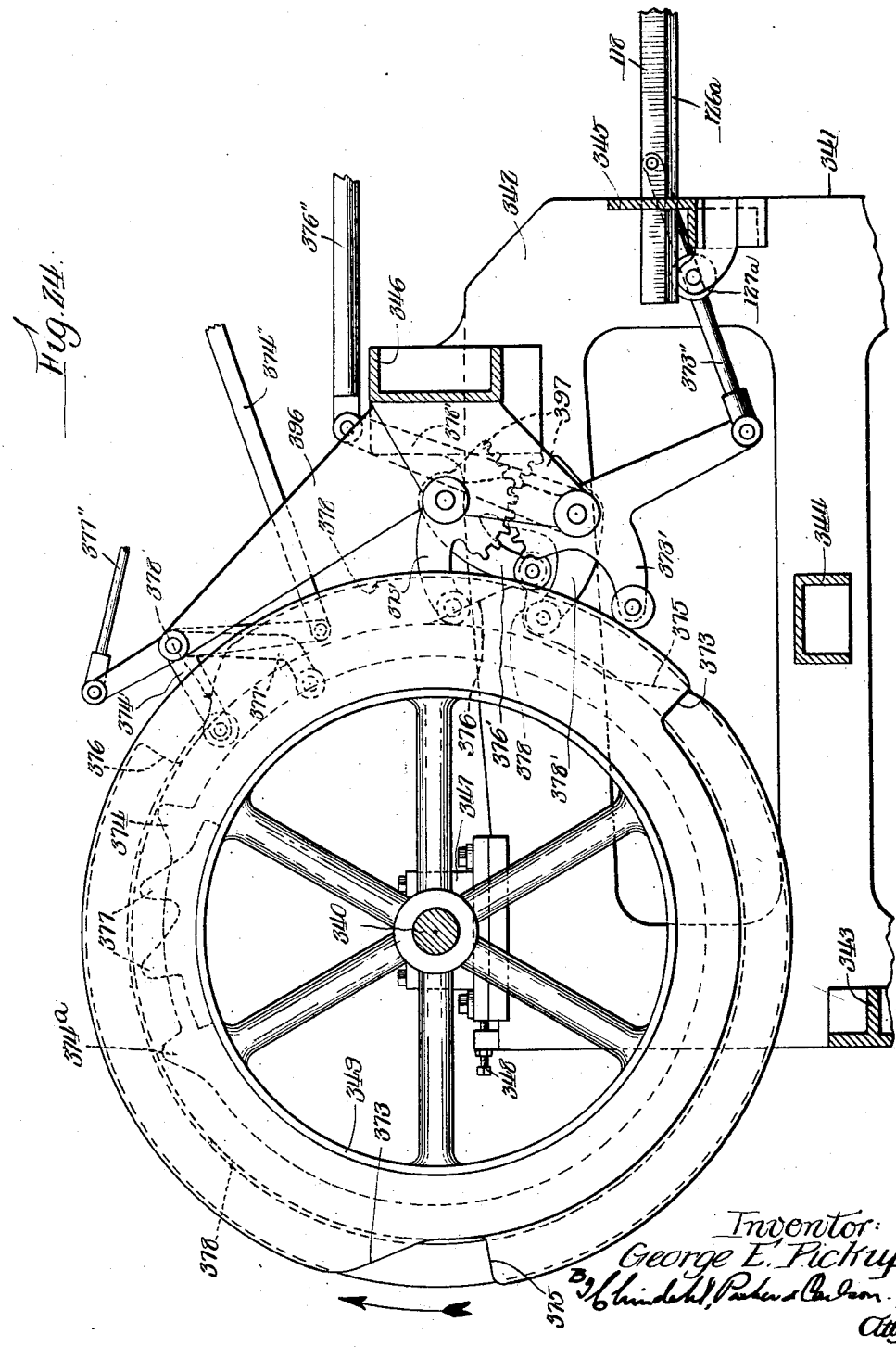

Patented June 17, 1930

1,763,862

UNITED STATES PATENT OFFICE

GEORGE E. PICKUP, OF NEWARK, OHIO, ASSIGNOR TO THE WEHRLE COMPANY, OF NEWARK, OHIO, A CORPORATION OF OHIO

MOLDING MACHINE

Application filed September 24, 1926. Serial No. 137,407.

This invention relates generally to molding machines, and more particularly to a machine which is fully automatic in operation.

It is the general object of the invention to provide a practical molding machine which is fully automatic and adapted for continuous operation.

Another object of the invention is to provide an automatic molding machine capable of producing a completed mold in less time than heretofore.

Another object of the invention is to provide such a machine which is definite in its operation and which embodies devices insuring continuous production of completed molds without the presence of an operator.

Other objects include the provision in a machine of this type of new and improved means to support and assemble the flash sections; means to support the pattern; means to clamp the flask sections together and to pivot the flask; means to discharge measured quantities of parting and molding sand into the cope and drag sections of the flask in timed relation with a roll-over movement of the flasks; means to support and apply drag boards; means to clamp the drag boards to the flask; means to ram both sections of the flask simultaneously; means to rap the pattern and to draw the pattern from the flask sections; means to withdraw the mold from the flask; means to remove the completed mold from the machine; and other new and improved features hereinafter more fully described.

In pursuance of the foregoing and other objects, I aim to provide a power-driven machine in which the parts of the mold are supported and actuated mechanically, and wherein sand and drag boards are supplied intermittently from hoppers to permit of complete automatic operation of the machine.

Further objects and advantages of the invention will become apparent as the description proceeds.

In the drawings:

Fig. 2 is a vertical central section taken along the line 2—2 of Fig. 3.

Fig. 3 is a vertical central section taken along the line 3—3 of Fig. 2.

Fig. 4 is a side elevation taken from the left hand side of the machine looking at Fig. 2.

Fig. 4$^a$ is a central vertical section taken through the bellows device for the parting sand.

Fig. 5 is a vertical central section of the lower portion of the machine taken along a continuation of the line 3—3 of Fig. 2.

Fig. 6 is a detail of the trip mechanism for the gate of the main hopper.

Fig. 7 is a plan view of the measuring hopper.

Fig. 8 is an end view thereof showing the gate for the hopper and a part of its operating mechanism.

Fig. 9 is a detail of the trip means for the parting sand bellows device.

Fig. 10 is a plan section taken along the line 10—10 of Fig. 2, showing the cope together with its operating mechanism and supporting frame.

Fig. 11 is a section taken in the plane of line 11—11 of Fig. 12, but with flask assembled, showing the sand strip operating mechanism and a portion of the means to clamp the cope and drag sections together.

Fig. 12 is an enlarged front elevation of the flask sections assembled, including portions of the cope and drag supporting frames and their operating mechanisms.

Fig. 13 is a section taken along the line 13—13 of Fig. 12.

Fig. 14 is an enlarged central section through the flask and the cope board, taken in the plane of line 14—14 of Fig. 2, but with parts in different relative positions.

Fig. 14$^a$ is a section taken along the line 14$^a$—14$^a$ of Fig. 14.

Fig. 14$^b$ is a plan view of the pattern plate mounting two patterns for molding stove lids.

Fig. 14$^c$ is a section along the line 14$^c$—14$^c$ of Fig. 14$^b$.

Fig. 15 is a plan section taken along the line 15—15 of Fig. 5, showing principally, the mold carrier, the pattern carrier, and the drag section of the flask.

Figure 16:
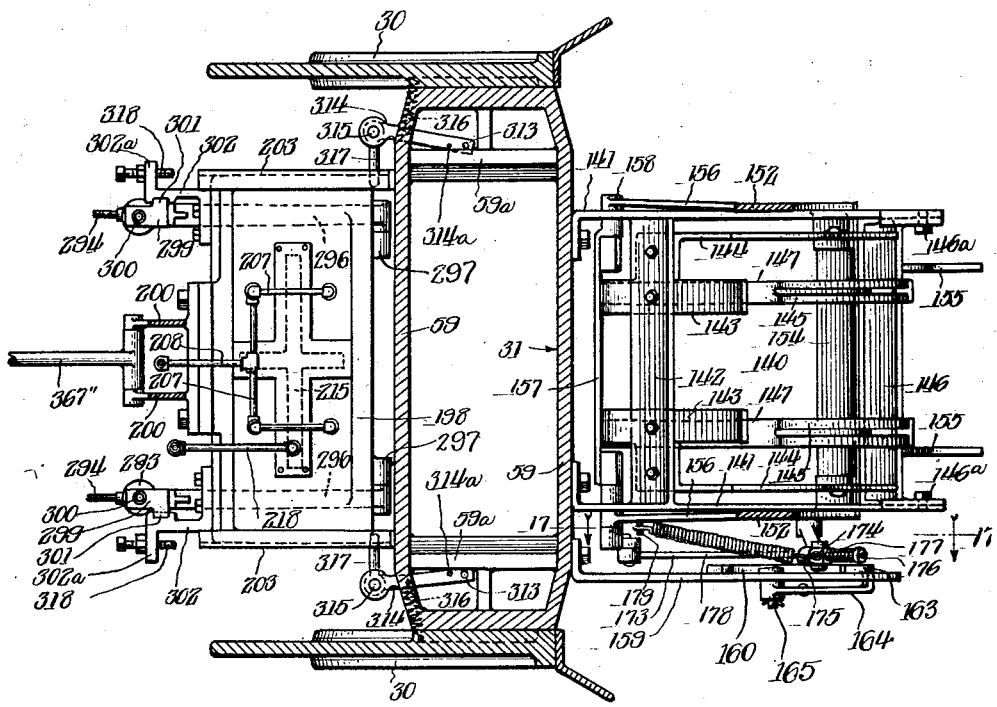

Fig. 16 is a plan section taken along the line 16—16 of Fig. 3, showing the cope board and the drag board hopper.

Figure 17:
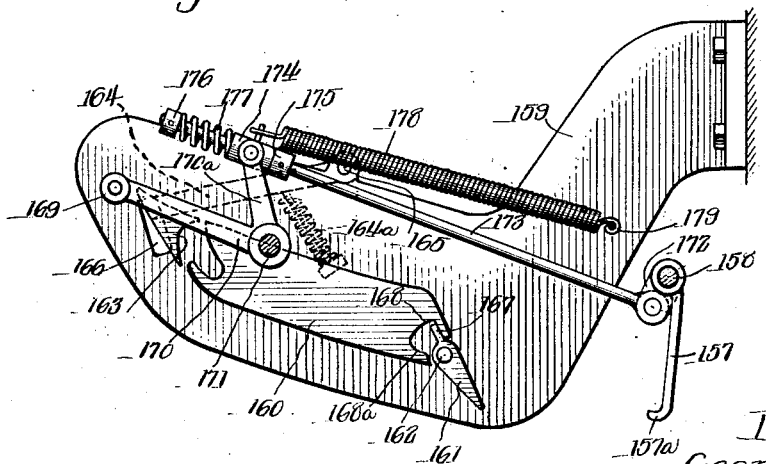

Fig. 17 is a view taken along the line 17—17 of Fig. 16, showing a part of the operating mechanism for the gate on the drag board pusher.

Fig. 18 is an enlarged fragmental side elevation looking at the right hand side of Fig. 2, and showing the operating mechanism for the flask and the lost motion connection for the drag board clamps, the flask being shown with the cope uppermost.

Fig. 19 is a similar view of the parts with the drag uppermost.

Fig. 20 is a plan view of the cam mechanism.

Fig. 21 is a side elevation of the cam mechanism.

Fig. 22 is a vertical section taken along the line 22—22 of Fig. 20.

Fig. 23 is a vertical section taken along the line 23—23 of Fig. 20.

Fig. 24 is a vertical section taken along the line 24—24 of Fig. 20.

For purposes of disclosure, I have illustrated in the drawings and will hereinafter describe in detail the preferred embodiment of the invention, with the understanding that I do not intend to limit my invention to the particular construction and arrangement shown, it being contemplated that various changes may be made by those skilled in the art without departing from the spirit and scope of the appended claims.

The invention comprises generally a frame A (Figs. 1, 2 and 4) upon which the various parts of the flask, the sand measuring and discharging devices, and the ramming means, together with their operating mechanisms, are mounted; a power-driven cam mechanism B (Figs. 1 and 20-24) embodying a plurality of cams and cam followers; and connecting devices E (Fig. 1) between the cam followers and the said operating mechanisms, the cam mechanism serving to actuate the various parts in proper sequence. I shall consider, first, the devices and mechanisms carried upon the main frame; second, the cam mechanism and the connecting devices; and, third, the operation of the machine.

Figure 1:
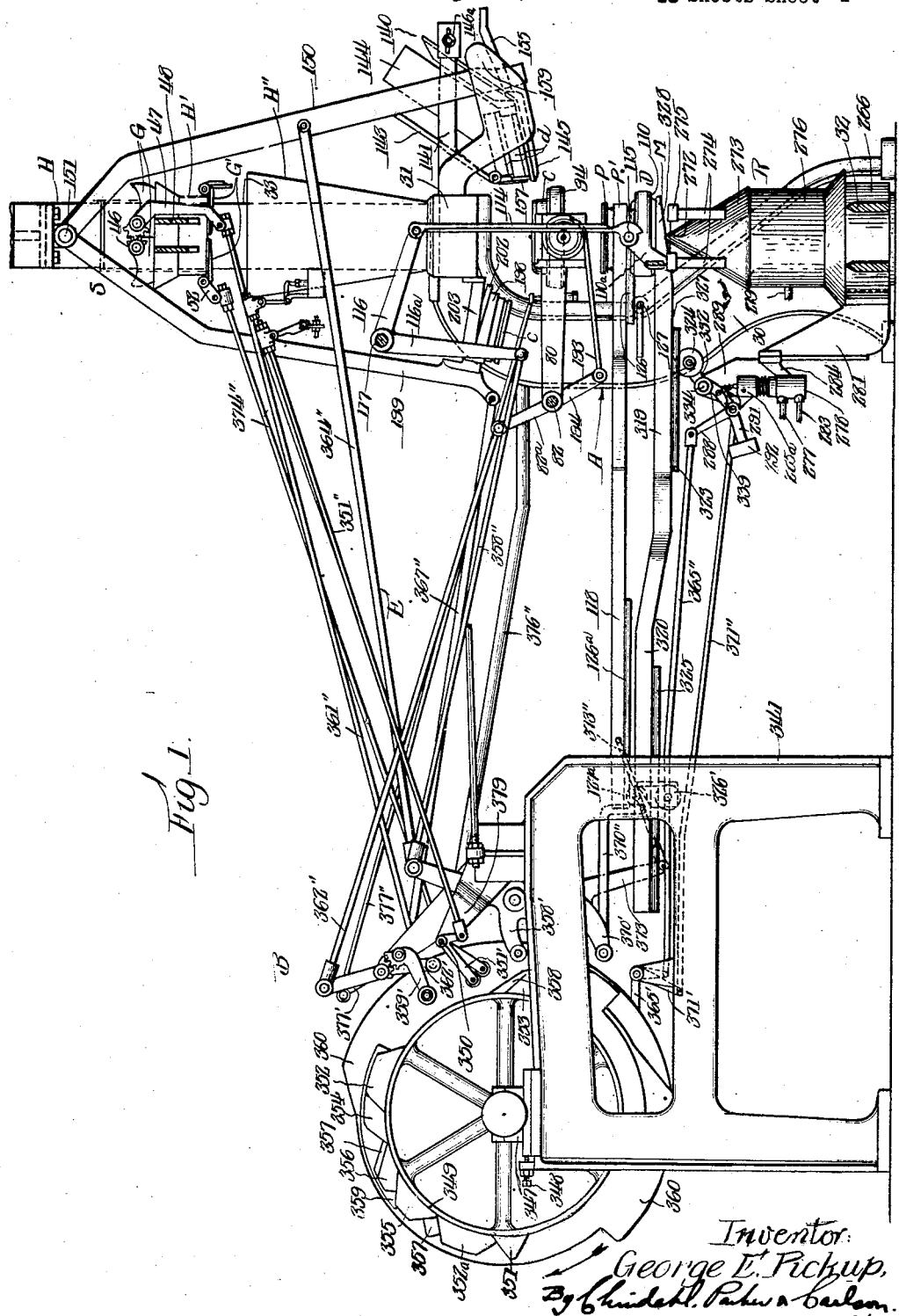
Figure 1 is a side elevation of the preferred form of the invention with certain parts omitted for the sake of clearness.

As illustrated generally in Fig. 1, and more particularly in Figs. 4 and 5, the invention comprises (see Fig. 1) the main frame A upon which sand supply devices S, a flask comprising a cope C and drag D, and a ramming means R, are permanently mounted, preferably with the flask positioned vertically above the ramming means and beneath the sand supply. The sand supply devices include means for conveying sand to and from the machine and for discharging it in predetermined quantities into the cope and drag sections of the flask. The flask sections are supported so that the cope and drag may be assembled with a pattern plate P therebetween, after which the assembled flask is rolled-over, first to place the drag uppermost and under the sand supply, (a drag board $d$ being applied automatically after the drag has been filled with sand) and then to place the cope uppermost and under the sand supply. A cope board $c$ carried on a swingable frame is adapted to be swung over the cope whereupon the ramming means is operated to ram both sections of the flask simultaneously.

*Main frame*

The main frame A illustrated most fully in Figs. 1, 2, 4 and 5, embodies a pair of cast base sections 30 spaced laterally by means of an upper cross head 31 and a lower cross head 32 bolted therebetween. Secured to and extending upwardly from these base sections are channel-like top sections 33 adapted to support the upper parts of the machine. The two laterally spaced standards thus formed are further secured rigidly together in their spaced relation by various parts of the machine as will be brought forth hereinafter.

On the upper portions of this main frame the sand supply and distributing devices are mounted. Near the base the various parts of flask are supported.

*Sand supply*

The sand supply for the machine contemplates a conveyor S' (Figs. 3 and 5) adapted to discharge into a main hopper H from whence sand is in turn discharged into a measuring hopper H'. From the measuring hopper measured quantities of sand are passed through a distributing chute H'' to the flask.

As illustrated herein, the sand conveying system includes the chain conveyor S' which passes through a sand storage and conditioning apparatus (not shown), then above one or more machines to carry sand to the main hoppers H, then down and back under the machine or machines as shown in Fig. 5, to gather excess sand which has fallen from the machine into a receiving hopper H$^r$ and then back to the conditioning apparatus. This provides for a continuous supply of conditioned sand to the main hoppers and for the automatic removal of the stray sand which collects below the machine.

As shown herein, the conveyor S' comprises upper and lower troughs 34 and a chain having links 35. The chain is guided and carried by means of a plurality of pairs of flanged wheels 36 running on a suitably supported set of rails 37. A series of paddles 38 secured to the chain, drag in the troughs and push the sand along therein. An aperture 39 is provided in the upper trough coinciding with the top of each main hopper so that when the conveyor is in operation sand falls into the main hoppers through these apertures, it being evident that when a main hopper is filled, the paddles 38 move the sand across the top of the filled hopper and on to the next one. The main hoppers are preferably welded to the upper trough around their upper edges to prevent leakage of the sand. Sand collecting in the receiving hopper H$^r$ discharges through an outlet 40 therein and into the lower trough 34 wherefrom it is carried away by the conveyor.

The main hopper H (Figs. 2 and 3) comprises a vertical rectangular spout 42 which, as hereinbefore mentioned is welded at its upper edge to the upper conveyor trough 34, and a lower portion 43. This lower portion is cast integrally with a cross head 44 which is bolted between the top sections 33 of the frame A. The spout 42 fits snugly within this portion 43 of the hopper and has an external flange 45 adapted to rest on the top edge thereof.

A gate is provided on the main hopper to control the discharge of sand therefrom and into the measuring hopper H'. This gate (Figs. 1, 2, 3, 4 and 8) comprises a pair of arcuate shutters G pivotally supported on the cross head portion 43 of the hopper. These shutters have intermeshing segmental gears 46 rigid therewith so that by means of an arm 47 extending from one shutter, the two shutters may be operated simultaneously.

The measuring hopper H' (Figs. 1, 2, 3, 7 and 8) is cast integrally with a cross head 48 which is also bolted between the upper sections 33 of the frame A. This hopper may be rectangular in shape and preferably is flared outwardly at its upper edge. It is positioned so as to extend above and to surround the discharge opening in the main hopper. Thereby, when sand is discharged from the main hopper H into the measuring hopper the amount discharged is determined not by the length of time the shutters G are open, but by the volumetric content of the measuring hopper. Thus sand is discharged from the main hopper until it fills the hopper H' and therefore stops flowing. Then when the shutters G close they strike off the vertical column of sand in the hoppers leaving a predetermined amount in the lower hopper H'.

From the measuring hopper the sand is discharged into the flask through a gate and the distributing chute H''. The gate comprises a pair of trap-door shutters G' which form the bottom of the hopper. These shutters are pivoted on shafts 49 (see Fig. 8) which are pivotally supported along opposite sides of the hopper, and are interconnected so as to pivot simultaneously by means of arms 50 on the shafts 49 connected at their outer ends by a link 51. The doors are closed by means including a weighted arm 52 pivoted on a stud 52$^a$ on one of the uprights 33 (Figs. 2 and 7) and operatively connected with the main cam mechanism as hereinafter described, and are held shut by means of a pair of latches 53. A lug 52$^b$ projecting from the arm 52 is adapted to engage one of the arms 50 during a swinging movement of the arm 52 (Figs. 4 and 8) to raise the gates to their latched position. These latches are carried on shafts 54 (see Fig. 2) which are pivotally mounted on the cross head 48 and hopper H' and are equipped with notches 55 which engage projecting portions of the dogs G' when the doors are in their closed position. One of the latches has an upwardly extending arm 54$^a$ arranged to be operated at the proper time, and the shafts 54 are adapted to be pivoted simultaneously by means of this arm 54$^a$, the shafts being interconnected by means of a pair of arms 56 thereon connected between their free ends by a rod 57 (Figs. 2 and 4).

The latches 53 are normally held in position to engage with the doors of the gate to hold them closed, and are actuated by a trip device to release the doors, whereupon the sand, due to its own weight, swings the doors on their pivots and discharges through the distributing chute and into the flask. This trip device is actuated by the flask during the roll over operation and will be more fully described hereinafter.

The distributing chute H'' as shown in Figs. 1, 2 and 3 is positioned below the measuring hopper H' and intermediate that hopper and the flask for the purpose of properly distributing the sand in the flask. This chute is generally rectangular in horizontal section. At its upper end the chute is larger than the discharge opening in the measuring hopper, and at its lower end it is of a size and shape adapted to the flask into which the sand is to be directed, the sides of the chute converging toward the bottom. The chute is supported near its upper end by means of a pair of brackets 58 (Fig. 2) bolted intermediate the top sections 33 of the frame A and the adjacent side walls of the chute, and is supported at its lower end by fitting snugly within the side walls 59 of the cross head 31.

Within the chute, vanes are positioned to break up the sand in its descent and to distribute it properly in the flask. These vanes (Figs. 2 and 3) preferably comprise a pair of A-shaped frames 60 supported from the sides of the chute by means of L-shaped brackets 61 and secured together in spaced relation by transverse bars 62. At the outlet of the chute a rectangular frame 63 is provided with outwardly flaring sides to peen the sand along the outer edges of the flask, and additional transverse bars 64, 65 and 66 assist in obtaining the proper distribution and peening of the sand.

A vibrator 67 (Fig. 3) is preferably provided on the main hopper H to insure discharge of sand therefrom when the shutters G are opened. This vibrator may be of any preferred construction and, as herein illustrated, is adapted to be actuated by compressed air admitted through a supply conduit 67$^a$ (shown only in part) which contains a control valve $v^2$ (Figs. 2 and 4).

In addition to the above mentioned hoppers and devices for the molding sand, means is provided to discharge parting sand into the flask and onto the pattern prior to the discharge of molding sand. This means comprises a pair of containers 68 (Fig. 2), one on each side of the distributing chute. These containers are supported on the cross head 31 and have converging sides which define outlets 69 at the bottom thereof. Nozzles 70 of a suitable construction have a small plate-like extension 70$^a$ positioned under the outlets 69 so as to support a small column of the sand, and are positioned to discharge air across the plates in a well known manner so as to blow a charge of parting sand from the exposed column and onto the pattern plate in the flask.

A bellows device is provided for the sand containers 68 and is connected to the nozzles 70 to discharge air therethrough. This bellows device comprises telescoping cylinders 71 and 71$^a$ (Figs. 4 and 4$^a$), the cylinder 71 being supported on the frame A by means of a bracket 72 formed integrally therewith. The chamber formed between the two cylinders is connected with the nozzles 70 by means of a duct 73 and a suitable conduit 73$^a$. A check valve 74 is placed in this duct adapted to permit discharge of air from the bellows chamber into the conduit but not vice versa. A check valve 75 is provided between the duct 73 and atmosphere to provide an air intake means for the bellows chamber. It will be obvious that upon separating the cylinders 71 and 71$^a$ air will be sucked in through the check valve 75 and upon bringing the cylinders together the air in the chamber will be discharged through the valve 74 and from the nozzles 70.

The movable cylinder 71$^a$ is herein shown screw threaded on the lower end of an actuating rod 76. The upper end of this rod is slidable in an aperture through a horizontal bracket 77, and is provided with a shoulder 76$^a$ (Fig. 9) formed by a notch 79 in the rod, this shoulder being engageable by a trip mechanism hereinafter described, to raise the rod. A spring 78 surrounding the rod between the top of the cylinder 71$^a$ and the bracket 77 is adapted normally to hold the cylinder 71$^a$ down. During the operation of the machine the trip mechanism operates to raise the rod a predetermined distance and then to release it, air being drawn into the chamber during the ascent of the rod and discharged therefrom during the spring actuated return thereof.

Flask

The flask (Figs. 2, 3 and 14) includes the cope C and the drag D in between which a pattern $p$, carried on the plate P, may be inserted and clamped.

In the preferred form of the invention the cope and drag sections are carried on independent vertically movable frames. The pattern plate P is supported on a carrier P′ (Fig. 1) which may be moved forwardly to place the pattern plate between the cope and the drag, or rearwardly to withdraw the pattern plate from between the cope and drag.

The cope and drag are pivotally mounted on their frames about axes which are alined when the drag is adjacent the cope and the pattern plate therebetween (Figs. 12 and 13). This is for the purpose of permitting the two sections of the flask to be pivoted simultaneously when they are assembled, so as to effect a roll-over of the flask to bring the drag uppermost. It is during this roll-over movement that the parting sand bellows and the measuring hopper latches 53 are actuated, as hereinafter more fully described.

Cope

As illustrated in the drawings the cope C is pivoted on a frame which is swingable about a horizontal axis, thereby to permit the cope to be raised and lowered in the machine. This frame (Figs. 1, 3, 4, 5, 10, 13, 18 and 19) comprises a pair of arms 80 secured rigidly together in laterally spaced relation by means of cross ribs 81 (Fig. 10). The rear ends of the arms are pivoted on a shaft 82 journaled in bearing blocks 83 on the base sections 30 of the frame A. At their forward ends these arms support a pair of alined bearing blocks 84 which carry bearings 85 for the cope (Fig. 13).

The cope C is provided with laterally extending arms 86 (Figs. 10, 12 and 13) formed integrally therewith. At their outer ends these arms have cylindrical surfaces 87 which engage the bearings 85 of the cope frame. The cope supporting frame is relatively free to pivot on the shaft 82 and is preferably counter-weighted so as to require a minimum amount of power in its operation. Herein the counterweight means comprises a pair of levers 88 pivoted intermediate their ends to the frame A on pins 88$^a$ (Figs. 4, 18 and 19). The forward ends of the levers are connected to the cope frame at a point above the bearings 85 by means of links 89 and straps 89$^a$. The opposite ends of the levers carry weights 90 adjustable thereon.

The bearing blocks 84 are illustrated herein as having arms 84$^a$ integral therewith and extending forwardly therefrom (Figs. 4 and 18). The forward ends of these arms are connected to a pair of dash-pot cylinders 91 by means of a pair of links 92, the pistons 91ᵇ of the dash pots being supported on the main frame A by means of a pair of brackets 91ᵃ. As the cope frame 80 is raised, air is drawn into the cylinders 91 above the pistons 91ᵇ through check valves 91ᶜ, and as the cope frame is lowered the cylinders exhaust through needle valves 91ᵈ. These dash pots are preferably provided in order to cushion the decent of the cope when the flask is parted, as hereinafter more fully described.

Sand strips 93 (Figs. 10, 11 and 13) are provided on the cope for the purpose of holding the sand in the cope when the cope is uppermost and the pattern is being drawn downwardly. These strips are carried on a pair of lateral ribs 94 by means of a plurality of intermediate members 95. The ribs 94 are supported at their ends (Fig. 11) on arms 96 and 97 of bell cranks 98 and 99 pivoted to the opposite ends of cross arms 100 of the cope on pins 101. The other arms of the bell cranks are interconnected to operate simultaneously, a nut 102 bolted to the arm 103 of crank 98 being guided in a slot 104 in the arm 105 of crank 99. A spring 106 interposed between the pivot pin 101 and a lug 107 on an extension 105ᵃ of the arm 105 of the crank 99 is adapted to coact with the arms 103 and 105 to form a toggle-like device which, when the bell cranks are in the position shown in Fig. 11, locks the bell cranks in that position with the sand strips extending into the cope. When the sand strips are withdrawn, the spring acts to lock the toggle mechanism in that position also. A roller 108 carried on the extension 105ᵃ of the crank 99 is adapted to engage a cam surface 109 carried on the drag section, to actuate the sand strip mechanisms to insert the strip during a roll-over movement of the flask, and means is provided adapted to engage a flattened portion 105ᵇ of the arm 105 to release the strips at the proper time, as hereinafter more fully described.

Drag

Generally stated, the drag D (Figs. 2, 4, 12 and 13) is pivotally mounted on a pair of vertically movable slides which are carried on the cope frame so that the drag may be raised to a position adjacent the cope wherein the pivots of the drag are coaxial with the pivots 85 of the cope. The two sections may then be pivoted simultaneously.

As illustrated in Figs. 12, 13 and 15, the drag is provided with laterally extending L-shaped arms 110 which are attached to the drag at its forward edge and extend outwardly and rearwardly therefrom (Fig. 15). At their rear ends the arms 110 have downwardly extending portions 110ᵃ (Figs. 11 and 12) upon which channel-like members 111 are secured by means of bolts 111ᵃ. These channel-like members provide vertical guideways 112 which are adapted to engage vertical guides 113 (Figs. 12 and 13) carried on the cope frame.

The drag is raised and lowered along these guides by means of a pair of links 114 which are pivoted at their lower ends 115 to the arms 110 of the drag and are pivoted at their upper ends to the free ends of a pair of arms 116 rigid on a shaft 117 journaled on the standards of the frame A. A counterweight 117ᵃ is preferably provided on an arm 117ᵇ extending rearwardly from the shaft 117.

Pattern plate

The pattern p to be used in making the mold, is formed integrally with a plate P (Fig. 14). This plate, as illustrated in Figs. 1, 2 and 3, is normally carried upon a frame P′ movable longitudinally from the front to the rear of the machine. This frame (Fig. 15) comprises longitudinal rods 118 and 119 secured together in laterally spaced relation by means of a lateral brace rod 120 and a diagonal brace rod 121. The forward ends of the rods 118 and 119 each have inward extensions 122 and 123 in which adjusting screws 124 having lock nuts 125 are positioned to support the pattern plate P′ at its four corners. The longitudinal rods also have inverted V-shaped ways 126 (Fig. 2) rigid therewith which engage with rollers 127 journaled in brackets 128 on the main frame uprights 30 to support the forward portion of the frame for movement longitudinally of the machine. The rear portion of the rod 118 is similarly supported by a roller 127ᵃ (Fig. 1) mounted on the cam structure B and engaging an inverted V-shaped way 126ᵃ. One or more sprue pins 129 are carried directly upon the pattern.

In Figs. 14ᵇ and 14ᶜ is illustrated a preferred form of pattern plate carrying two patterns for stove lids. Means is provided upon this plate adapted to be operated by the main cam mechanism to form cavities in the sand for molding a pair of prongs in the handle sockets of the lids.

As illustrated, this plate P is generally rectangular in form and is provided with a lug 400 at each corner thereof adapted to rest on the screws 124 of the pattern carrier. Lugs 401 positioned centrally of the ends of the plate are provided with suitable apertures 402 adapted to admit the pins carried on the drag for the purpose of centering the flask sections when assembled, as hereinafter described.

The patterns p for the stove lids are shown only in part, the handle sockets being designated as 403. A pair of parallel bars 404 are supported in the plate for longitudinal sliding movement, one on each side of the said handle sockets. Arms 405 integral with and projecting in opposite directions from the slidable bars 404 are bifurcated at their free ends. Pins 406 also slidably mounted in the pattern plate for longitudinal movement parallel to the slidable bars are adapted to form the desired cavities in the mold, and are provided with projecting lugs 407 adapted to enter the bifurcated ends of the arms 405 so that movement of the slidable bars 404 longitudinally of the plate causes a similar movement of the pins 406.

Means is provided to actuate the slidable bars simultaneously and in opposite directions so that during one actuation of the bars the pins 406 are inserted a predetermined distance into the handle sockets 403 as shown in the drawings, and upon a reverse actuation of the bars the pins 406 are withdrawn from the handle sockets. This means comprises a lever 408 pivoted intermediate its ends to the pattern plate P at 409 at one end of the slidable bars and midway therebetween. The opposite ends of this lever are adapted to engage notches 410 in the slidable bars 404 so that upon being pivoted on its axis the lever actuates the bars in opposite directions. An arm 411 integral with this lever is adapted to engage one end of a rod 412 slidably supported on the pattern plate for movement transversely thereof. This rod extends beyond the rear edge of the plate P and is adapted to be actuated by the main cam mechanism to insert the pins 406 into the handle sockets, as hereinafter more fully described. The pins are normally held withdrawn from the handle socket by means herein disclosed as comprising a pair of arms 413 integral with the slidable bars 404 and extending therefrom in opposite directions, and a coil spring 414 disposed intermediate the free ends of said arms and adapted to urge the arms apart.

It will be apparent that movement of the rod 412 transversely of the pattern plate pivots the lever 408 and inserts the pins 406 into the handle sockets, and that release of the transverse rod 412 will permit the coil spring 414 to withdraw the pins from the handle sockets. As shown in Fig. 10, the means provided to actuate the rod 412 comprises a lever 415 pivoted intermediate its ends to a bracket 416 secured to the forward cross rib 81 of the cope supporting frame. The end 417 of this lever is adapted to engage with the outer end of the transverse rod 412 on the pattern plate P to actuate the rod. The other end of the lever is connected to the main cam mechanism, as hereinafter more fully described.

When, during the operation of the machine, the flask is assembled, the drag is raised vertically, (being guided toward the cope by the guides 113 on the cope frame), and picks the pattern plate P off the pattern carrier P' and carries the plate upward into engagement with the cope. Pins 130 (Fig. 2) on the drag then enter the apertures 402 in the pattern plate and the sockets 131 in the cope to aline the pattern plate and the two sections of the flask. In this raised position the pivots 115 of the drag are alined with the pivot bearings 85 of the cope. The flask is then rolled-over to bring the drag uppermost (Fig. 12), during the initial portion of which movement the cope and drag are held in their adjacent positions by means of the links 114 which are held in their elevated position. Means is also provided to clamp the drag to the cope for the final portion of the roll-over movement. This means is herein disclosed as comprising a pair of rollers 132 (Figs. 11 and 12) carried on arms 133 which are rigid with the cope arms 86. During the pivot or roll-over movement of the flask, these rollers engage cam surfaces 134 on the drag frame actuating rods 114. It is obvious that with these rollers in engagement with the cams the cope is locked to the drag with the pattern therebetween.

*Flask operating mechanism*

The roll-over or pivotal movement of the flask is accomplished by means of an arm 220 (Figs. 18 and 19) rigidly secured to one of the arms 86 on the cope and connected to the main cam mechanism. The connection as illustrated herein comprises the rod 376" which is movable forwardly and rearwardly by the action of a cam hereinafter more fully described.

The forward end of this rod has a portion 221 reduced slightly in cross section, upon which a collar 222 is slidable. This collar has a depending arm 223 integral with the forward end of a bifurcated bar 224 (Fig. 10) which extends parallel to the rod 376". The rear end of this bar is also supported from the rod 376" by means of an arm 225 integral with the said rod and projecting rearwardly thereof and parallel thereto. This arm passes through an aperture in the cross portion 226 of the bifurcated bar to permit sliding movement of the bar thereon. Bushings 227 preferably of a resilient material are inserted between the collar 222 and a nut device 228 on the forward end of the rod 376" and between the rear end of the bar 224 and a second nut device 229 on the rear end of the arm 225 so as to provide a slightly yieldable connection between the bifurcated bar 224 and the rod 376".

The arm 220 on the cope is preferably triangular in shape and has a double link 230 pivoted thereto by means of a pin 231. The other end of this link is pivotally connected to the forward end of the bar 224 by means of a pin 232. As shown in Fig. 18 with the cope uppermost, the rod 376" is in its forward position and the link 230 is pivoted substantially at right angles to the bar 224 and abuts the peripheral edge of the triangular arm 220. To place the drag uppermost the rod 376" is moved rearwardly, the arm 220 on the cope then being actuated through 180° to the position shown in Fig. 19 wherein the link 230 is extended from the arm 220 and is parallel to the bar 224.

To insure horizontal positioning of the flask in these roll-over movements, suitable stop devices are preferably provided. These devices may comprise a collar 233 (Figs. 2, 12 and 13) mounted rotatably on one of the bearing blocks 84 of the cope frame. A pair of radially extending arms 234 are secured to this collar at diametrically opposed points and at their outer ends are provided with adjustable stop screws 235. A radially extending portion 236 of one of the arms 86 of the cope is adapted to engage these screws. To maintain these arms in a vertical position during the pivotal movements of the cope frame, a rod 237 (Figs. 18 and 19) is pivotally connected at one end thereof to the free end of the lower arm 234 and at its other end to a bracket 238 secured to the base section 30 of the main frame. This rod is parallel to the arms 80 of the cope frame so that upon pivotal movement of the cope frame about the shaft 82 the rod 237 pivots on the bracket 238 and the arms 234 are retained in their vertical position. As the portion 236 of the cope arm 86 is stopped against the screws 235 the flash after each roll-over movement is thereby stopped in a horizontal position.

During each roll-over of the flash and just before the roll-over is completed, trip devices are actuated, the first to actuate the bellows device to discharge parting sand onto the pattern plate, and immediately thereafter a second, to release the latches 53 which hold the doors G' of the measuring hopper closed.

The trip mechanism for the bellows device (Figs. 2, 4, 9 and 13) comprises a short rocker arm 239 (Fig. 9) secured to a shaft 240 which is rotatably mounted upon spaced plates 241 and 241ᵃ secured to a top section 33 of the main frame. This rocker arm carries a pin 242 at its free end upon which an L-shaped dog 243 is pivoted. A spring 244 is positioned between a lug 245 on the rocker arm and the jaw portion of the dog so as normally to hold this portion pressed outwardly toward the rod 76 of the bellows device. The tail portion of the dog is provided with an adjustable stop screw 246 to limit the outward movement of the jaw portion.

The shaft 240 is also utilized to actuate the trip mechanism for the latches 53 of the measuring hopper gates in timed relation to the operation of the bellows device. Thus as shown in Figs. 2, 4, 6 and 8, a segmental trip element 247 (Fig. 6) is pivotally mounted upon the plate 241ᵃ secured to the main frame A. A rod 248 connects an eccentric pin 249 on the trip element 247 with the operating arm 54ᵃ of the latches 53. This rod is preferably weighted as by means of a weight 250 so as normally to hold the latches 53 in their holding position.

To actuate the element 247 so as to release the latches, a dog 251 is pivotally mounted upon an arm 252 secured to the shaft 240. This dog is also L-shaped, and a spring 253 is positioned between the jaw portion of the dog and the hub of the arm 252 to hold the dog pressed outwardly. The tail portion of the dog is provided with an adjusting stop screw 254.

It will be apparent that when the shaft 240 is rotated clockwise (Figs. 6 and 9) the jaw portion of the dog 243 will slip over the shoulder 76ᵃ and into the notch 79 of the rod 76, and the jaw of the dog 251 will slip under the edge of the trip element 247. Upon rotation of the shaft 240 in the opposite or counter-clockwise direction, the dog 243 will engage the shoulder 76ᵃ on the rod 76 and raise the rod and thereby expand the bellows, until the jaw of the dog, which travels in an arcuate path, slips off from the shoulder. The rod 76 is then forced downward by the action of the spring 78 (Figs. 4 and 4ᵃ) to compress the bellows. Likewise the dog 251 will engage and pivot the trip element 247 and thereby release the latches 53 momentarily or until the dog in its arcuate movement rides off from the trip element.

The dogs 243 and 251 are preferably positioned so that immediately after the bellows device has been actuated to discharge parting sand into the flask, the gates of the measuring hopper are released to discharge molding sand into the flask. These discharges occur twice in the making of a mold, i. e. once for the drag and again for the cope.

To give to the arms 239 and 252 the desired oscillatory movements, the shaft 240 is rocked by means of an arm 255 (Fig. 2), the free end of which is connected to an arm 256 (Fig. 4) secured to an arm 86 of the cope so as to pivot therewith. The connection between these arms comprises a bell crank 257 (Fig. 4) which is pivoted to a bracket 258 extending from the main frame A. The lower arm 259 of this bell crank is connected to the free end of the arm 256 by means of a link 260 and the other arm 261 of the bell crank is connected to the free end of the arm 255 by means comprising an adjustable link 262 and pivot links 263 and 264. These pivot links are preferably inserted to permit of the slight universal motion which is necessary.

A reference to Fig. 4, in which the cope section is shown uppermost, will disclose that upon a counter-clockwise roll-over of the flask the arm 256 actuates the bell crank arm 259 first counter-clockwise, during the first 90° pivot of the flask, and then clockwise during the remaining 90° pivot of the flask.

This oscillation of the bell crank arm causes the required rocking of the shaft 240 through the intermediate connections. Similarly, a roll-over of the flask clockwise to place the cope uppermost again, will cause a similar oscillation of the bell crank arm 259 and shaft 240. Thus the bellows trip device and the measuring hopper gate trip are actuated in the sequence mentioned and just prior to the completion of each roll-over.

*Drag board supply*

When the flask has been assembled, then rolled over to place the drag uppermost, and sand discharged into the drag, a drag board is applied to the drag.

Drag boards $d$ of any preferred construction are filled into a hopper 140 (Figs. 1, 3, 4, 16 and 17) from whence they are fed automatically onto the drag, one for each mold that is rammed. This hopper, in the exemplary form illustrated, is inclined so that it may be filled readily from the front of the machine, and is supported on a pair of brackets 141 extending forwardly from the cross head 31 of the frame A. A cross bar 142 is welded intermediate these brackets and supported thereon are a pair of inclined upper guide bars 143 and sides 144 of the hopper. A pair of lower guide bars 145 are carried on a cross bar 146 secured adjustably to the brackets 141 by means of bolts $146^a$. These lower guide bars have upper portions of T-section which are parallel to the upper guide bars 143 and have lower portions 147 which are substantially horizontal. These portions 147, as shown in Fig. 3, are adapted to support the drag boards $d$ and therefore are preferably provided with reenforcing ribs 148.

It is apparent that the lowermost board $d$ may pass out through an opening 149 between the lower guides 147 and the upper guides 143. Means is provided normally to close this opening to prevent a board from falling out. Means is also provided adapted to move the lowermost board from the hopper onto the drag. This latter means comprises a swingable frame 150 pivoted on the main frame A near the upper end thereof at 151. This frame consists of a pair of L-shaped arms 152 reenforced by a cross bar 153 and is operable by the cam mechanism through a rod 364″.

As shown in Fig. 16, the arms 152 pass outside the hopper brackets 141 and have mounted across their lower end a tie bar 154 to which a pair of arcuate pusher dogs 155 are secured. The leg portions 156 of the arms 152 extend rearwardly alongside the hopper toward the flask, they being of a length such that when the frame 150 is in its normal or forward position the leg portions extend to the rear of the hopper. A gate 157 is adapted to control the opening 149 in the rear of the hopper. This gate is preferably pivoted at 158 to the legs 156 of the swingable frame so that when the frame is swung rearwardly the gate moves with the frame and away from the opening as the dogs 155 push a board onto the flask. A hooked portion $157^a$ at the lower edge of the gate is adapted to hook under the rear edge of the drag board $d$ to carry that portion of the board during the rearward swing of the frame 150.

The gate, as illustrated herein, is constructed so that in the rearward movement of the swingable frame 150, during which a drag board is carried onto the flask, the lower edge of the gate strikes off any surplus sand from the top of the drag, and means is provided whereby, during the return or forward movement of the frame 150, the gate is pivoted to a raised position so as not to strike the drag board which was placed on the drag. This means comprises a cam device mounted on an L-shaped bracket 159 (Figs. 1, 4, 16 and 17) extending forwardly from the main frame A and along the left hand side of the hopper 140 (Fig. 16), and a follower carried on the swingable frame 150 and connected to the gate 157.

The cam device, as illustrated herein, comprises an elongated peripheral cam 160 mounted rigidly on one side of the bracket 159, a finger-like cam 161 pivoted to the bracket at 162, and a triangularly-shaped cam 163 carried on the free end of an arm 164 which is pivoted to the bracket at 165. This arm is positioned on the side of the bracket opposite the cam 160, the free end of the arm being bent inwardly to pass through a slot 166 in the bracket to support the cam 163, and is normally held in its raised position by a spring $164^a$. The finger 161 has a lug 167 extending within a slot 168 in the cam 160 to limit the pivotal movement thereof.

The follower consists of a roller 169 carried on one arm of a bell crank 170 which is pivotally mounted on the leg portion 156 of the swingable frame 150 at 171. The other arm $170^a$ of the bell crank is connected to the free end of an arm 172 which is secured to the pivot stud 158 of the gate 157. This connection comprises a link 173 pivoted to the arm 172 and carrying a slidable collar 174 which is pivoted to the bell crank arm $170^a$. This collar is confined in its sliding movement between collars 175 and 176 secured upon the rod, and is normally urged towards the collar 175 by a coil spring 177 surrounding the rod and disposed between the stationary collar 176 and the slidable collar 174. A coil spring 178 is connected between the collar 174 and an eye 179 on one leg 156 of the swingable frame 150, so that with this coil spring contracted fully the normal position of the parts are as in Fig. 17.

As shown in the drawings (Figs. 1, 3 and

4), the swingable frame 150 is in its forward position (it being noted that Fig. 17 is reversed from the position of the arm 159 shown in Figs. 4 and 16). When the frame is swung rearwardly (towards the right in Fig. 17) the roller 169 engages the lower edge of the cams 163 and 160, and the finger 161, thereby pivoting the bell crank 170 on its pivot 171 against the action of the springs 177 and 178 and pivoting the gate 157 against the lowermost board. This moves the portion 157$^a$ of the gate under the board and clamps the board between the gate and the pusher dogs 155. The finger 161, when engaged by the follower 169, pivots to its raised position with the lug 167 against the stop surface 168$^a$ of the slot 168. As the frame reaches its rearmost position the roller 169 runs off the end the finger, whereupon the finger drops by gravity to the position shown and the bell crank 170 pivots to raise the follower due to the action of the springs 177 and 178. During the return movement of the swingable frame, the roller runs up the upper edge of the finger and over the upper edge of the cams 160 and 163, thereby pivoting the bell crank arm 170$^a$ against the collar 175. This actuates the link 173 to pivot the arm 172 and raise the gate which is secured to the pivot shaft 158. Upon engaging the cam 163, the arm 164 is pivoted against the action of the spring 164$^a$ and the cam is depressed. In the forward position of the frame, however, the roller has run off this cam, as shown in Fig. 17. The arm 164 therefore assumes its upper position and thereby insures contact between the roller 169 and the lower surface of the cam 163 when the frame is again moved rearwardly, as the point of the cam then extends above the center of the roll.

Thus when the cope and drag have been assembled with the pattern plate P therebetween and then pivoted to bring the drag uppermost, after discharges of parting and molding sand into the drag, the swingable frame 150 is actuated, whereupon the gate 157 strikes the excess sand from the drag and the pusher dogs 155 and hooked portion 157$^a$ move a drag board $d$ thereon. Prior to a second roll-over of the flask to bring the cope uppermost, the drag board is clamped upon the drag by means now to be described.

Drag board clamps

The means provided to clamp the drag board upon the drag is herein illustrated (Figs. 2, 10, 12 and 13) as comprising three dogs 180, one dog being positioned along one side edge of the drag (Fig. 10) and a pair of dogs being positioned along the opposite side. The single dog is pivotally mounted on an arm 181 formed integrally with an arm 86 of the cope, whereas the pair on the opposite side of the drag are secured to a shaft 182 which is pivotally mounted in the free end of a bifurcated arm 181$^a$ formed integrally with the other arm 86 of the cope. These dogs are pivotable from the position shown in Fig. 12, wherein the clamping portions 180$^a$ of the dogs engage the outer surface of the drag board $d$ to clamp it onto the flask, to a position wherein the clamping portions are removed from the drag board (Fig. 2). The dogs are actuated by the main cam mechanism hereinafter described, through intermediate connecting devices including a lost motion device. Thus a pair of shafts 183 (Fig. 13) are rotatably mounted in the cope frame coaxially with the pivot bearings 85 of the frame, and a pair of shafts 184 are rotatably mounted in the cope frame at right angles to the shafts 183 and connected thereto by bevel gearing 185.

The shafts 184 have radially extending arms 186 pinned thereto, and links 187 are provided to connect the free ends of said arms with pins 188 carried eccentrically upon the dogs 180. The arms 186 and links 187 operate as a toggle to lock the dogs in their clamping position, finger-like projections 189 (Fig. 12) on the arms being provided to engage stop lugs 190 on the links to prevent release of the dogs by movement of the arms beyond the locked position of the toggles.

To operate the dogs 180 when the drag is in the uppermost or inverted position, and then to permit a roll-over of the flask without releasing the dogs, a lost motion device is provided in the connections between the shafts 183 and the main cam mechanism. A pair of collars 191 are rotatable one upon each of the shafts 183 and are provided with integral arms 192. Links 193 connect the free ends of these arms with the free ends of arms 194 (Figs. 18 and 19) which are secured at their opposite ends on the shaft 82. An arm 82$^a$ also is secured to this shaft, being connected to a follower in the main cam mechanism as hereinafter described. Secured to the shafts 183 adjacent the collars 191 are collars 195 each having a segmental tooth 196. Similar segmental teeth 197 are formed integrally one on each of the arms 192, these teeth being offset axially of the shafts in opposite directions so as to be adapted to interengage.

Thus, in the operation of the machine, when the drag is uppermost as shown in Figs. 12 and 19, and the links 193 are moved rearwardly to clamp the dogs 180 upon the drag board, the teeth 197 engage the teeth 196 and move counter-clockwise to the position shown in Fig. 19, and thereby cause the shafts 183 and 184 to rotate. The arms 186 then pivot to their locking positions and the dogs are thereby locked, by means of the links 187, against the drag board. When, during the next operation of the machine, the flask rolls-over, it does so in a counter-clockwise direction looking at Fig. 19, to the position shown in Fig. 18, wherein the portion 236 of the arm 86 is against the upper stop screw 235. The teeth 196 on the collars 195 then pivot with the flask and disengage from the teeth 197, thus leaving the dogs in the clamped position wherein they are held by the toggles. The teeth are preferably quadrants of a circle so that after a 180° roll-over of the flask, the radial faces of the teeth are again adjacent each other so that a clockwise movement of the arms 194 to position the parts as shown in Fig. 18, will release the clamps.

When a drag board has been clamped to the drag and the flask again rolled-over to place the cope uppermost, sand is again discharged from the parting sand and measuring hoppers, this time into the cope. A cope board $c$ of special construction is then applied.

Cope board

Herein this board is shown carried permanently upon a cross head 198 (Figs. 1, 3, 14 and 16) secured to the lower end of a swingable frame 199 (Fig. 3), the upper end of which is pivotally mounted on the main frame at 151. This frame comprises spaced members 200 reenforced by cross bars 201, and is adapted to oscillate from the position shown in Fig. 3 to the position shown in Fig. 14 wherein the cope board $c$ is vertically above the cope C. The cross head 198 is guided in this oscillatory movement by means of a pair of bars 202 which are secured to the cross head, and a pair of angle guides 203 secured to a side wall 59 of the cross head 31. This oscillatory movement is accomplished by means of a rod 367″ pivotally connected to the frame 199, and which is adapted to be actuated by the cam mechanism as hereinafter described.

As shown in Fig. 14, the cope board is adapted to fit within the cope C. A peripheral groove 204 (Figs. 14 and 14$^a$) in the board is connected with a suitable air supply. As illustrated herein, this connection comprises distributing ducts 205 along the edges of the board, and a plurality of chambers 206 formed within the board. Suitable conduits 207 connect with a single supply conduit (not shown) which contains a control valve $v^6$ (Fig. 2), and are adapted to admit compressed air into the said chambers. A plurality of ports 209 (Figs. 14 and 14$^a$) connect the chambers 206 with the ducts 205, and ports 210 connect the ducts with the peripheral groove 204. Thus with the cope board in the position shown in Fig. 14, operation of the valve $v^6$ to admit air to the conduits 207 causes a discharge of air from the ports 210 with the result that any loose sand surrounding the edge of the cope board is blown out.

Means is also provided on the cope board to coact with the sprue pin 129 on the pattern plate to form the sprue in the cope. This means is shown in Figs. 14 and 14$^a$ as comprising a hollow member 211 conical in form, movably secured to the under side of the cope board by means of a pair of plates 212 interfitting into a peripheral groove in said member and suitably secured to the board, as by means of brazing or welding. A chamber 213 having outlet ports 214 is preferably formed in the board immediately above this member and means provided to admit air thereto. For this purpose chambers 215 and 216 are interconnected by a port 217 and the upper chamber 216 is connected to a supply of compressed air by means of a conduit 218 (shown in part) which has a control valve $v^7$ (Fig. 2) therein. The lower chamber 215 preferably extends longitudinally and transversely of the board (Fig. 14$^a$) so that if desired a plurality of sprue pins 129 and hollow conical members 211 may be provided to form a plurality of sprues. A port 219 leading from the chamber 215 is adapted to direct air into the chamber 213 whereby loose sand in this chamber exhausts with the air through the ports 214.

Ramming means

With the cope board positioned above the cope, the mold is rammed, the two sections of the flask being rammed simultaneously.

The ramming means may be of any preferred construction. As illustrated herein (Figs. 1, 5 and 14), this means comprises a cylindrical barrel 265 which is supported in a collar 266 formed in the lower cross head 32 of the base section of the main frame. The lower portion of the barrel fits within this collar and has an annular flange 268 which bears upon the top edge thereof.

A piston 269 is reciprocable within the cylinder and is secured to the lower end of a hollow plunger 270 which extends upwardly out of the cylinder through a suitable packing box 271. This plunger carries a head 272 which is bolted thereon and is adapted to engage with a drag board $d$ (Fig. 14) during the ramming operation. This head is illustrated herein as a casting comprising a hollow conical portion 273 which forms a petticoat adapted to overlie the cylinder 265, and four web-like brackets 274 having bosses 275 formed thereon to serve as platens. A protective cover 276 is preferably secured to the lower edge of the petticoat to assist in preventing sand from falling onto the cylinder barrel and packing box when the plunger is elevated.

The ram is operated by means of a suitable pressure fluid (usually compressed air) admitted to and exhausted from the cylinder below the piston through a conduit 277 (Figs. 5 and 15) having a suitable valve device 278 therein, and to and from the cylinder above the piston through a conduit 279 having a similar valve device 280 therein. These valve devices are supported upon a bracket 281 extending rearwardly from the cross head 32 and comprise casings 282 having supply connections 283 thereon. The casings have arms 284 integral therewith which are bolted to the bracket 281. Valve within the casings 282 (not shown) are carried on hollow stems 285 extending out of the casings and are adapted to admit pressure fluid from the supply 283 to the cylinder 265 of the ram when the stems are depressed and to exhaust pressure fluid from the cylinder through ports 285$^a$ when the stems are in their normal or raised position. The stems are normally held up by means of springs 286 disposed between the casings 282 and heads 287 on the stems. The valves are operated by the main cam mechanism E by means of rods 365″ and 368″ which are connected to bell cranks 288, the bell cranks being pivotally mounted on a bracket 289 which is supported on the bracket 281. Adjustable screws 290 carried on one arm of each bell crank are adapted to engage the heads 287 of the valve stems to actuate the valves when the bell cranks are pivoted. Arms 291 formed integrally with the bell cranks are preferably provided with weights 292 to assist in returning the bell cranks to their normal position after having been actuated.

Operation of the valve 278 admits pressure fluid to the cylinder 265 below the piston 269 through the conduit 277 to raise the piston, any pressure fluid in the cylinder above the piston then exhausting through the conduit 279 and the hollow stem 285 and port 285$^a$ of the valve 280. When the valve 278 is closed and the valve 280 is opened, pressure fluid is admitted to the cylinder 265 above the piston 269 to lower the piston, the cylinder below the piston then exhausting through the conduit 277 and the hollow stem 285 and port 285$^a$ of valve 278.

When the valve 278 is actuated to admit pressure fluid to the cylinder 265, the piston and its head 272 are raised. As the head ascends and rams the mold the drag board clamps are released and the valves $v^6$ and $v^7$ (Fig. 2) are actuated by the main cam mechanism to permit discharge of air around the cope board and sprue pins, as described above. The valve 278 is then closed and the valve 280 is actuated to admit pressure fluid to the cylinder 265 through the conduit 279 to lower the piston slowly. During this descent of the piston the pattern plate P is rapped or vibrated so as to loosen the pattern from the sand in the cope and drag.

In the exemplary form of the invention the pattern is rapped by means which include a pair of air actuated vibrators 293 of suitable construction (Figs. 4, 14 and 16) carried upon the swingable cope board frame 199. These vibrators are supplied with air by means of conduits 294 which connect with a supply conduit controlled by a valve $v^5$ (Fig. 2). A pair of arms 296 are pivoted at their forward ends to a pair of lugs 297 integral with the cross head 198 of the cope board frame 199 and at the forward edge thereof. These arms extend rearwardly under the cross head and along the sides of the cope board $c$ and at their free ends are forked to admit the vibrators 293 between the prongs of the forks. As illustrated herein (Figs. 3, 14 and 16), one prong 298 of each fork is welded to one end of a vibrator and the other prongs 299 are provided with screw threaded apertures adapted to admit clamping bolts 300 which contact the other ends of the vibrators. Lugs 301 (Fig. 16) integral with the upper prongs 299 of the forked ends of the arms 296 are adapted to engage the upper edges of brackets 302 which are secured to the cross head 198 to limit the downward movement of the arms.

When the cope board is in its operative position vertically above the cope section of the flask, as illustrated in Fig. 14, the arms 296 are adapted to rest upon the upper ends of a pair of headed pins 303 (shown inverted in Fig. 12). These pins are slidably supported for limited vertical movement in brackets 304 integral with the cope and are positioned so that with the cope uppermost the lower ends of the pins rest upon the pattern plate P. Thus with the pins 303 resting upon the pattern plate, and the arms 296 resting upon the opposite ends of the pins, compressed air admitted to the vibrators 293 causes the arms 296 to vibrate and rap the pattern.

During the descent of the piston head 272, the cope stops when the arms 80 of the cope frame engage stop screws 304 secured in brackets 305 supported upon the base sections 30 of the main frame (Figs. 2, 4, 18 and 19). The pattern, having been rapped loose from the sand in the cope, is then drawn from the cope as it continues to descend with the drag until the pattern plate engages the supporting screws 124 on the pattern carrier P′. At this time the pattern carrier is preferably vibrated to rap the pattern loose from the drag and to insure proper drawing therefrom. In the exemplary embodiment of the invention this is accomplished by means of a suitable vibrator 306 (Fig. 3) carried permanently upon the pattern carrier P′. A supply conduit 307 is provided with a valve $v^1$ (Figs. 2 and 4) to control the admission of air to this vibrator. The pattern plate is thus stopped, the pattern is drawn from the drag and the drag continues to descend with the head 272. The cope board $c$ is then moved to its inoperative position, as shown in the drawings in Figs. 1, 3, 4 and 16, and the pattern carrier is withdrawn rearwardly from between the flask sections.

When the pattern carrier has reached its withdrawn position, the pattern and pattern plate are preferably cleaned and dried by means of air discharged from a plurality of nozzles 308 (Figs. 3, 5 and 10) inserted in conduits 309 which are carried upon bars 310 secured between the cross ribs 81 of the cope frame, and a plurality of nozzles 308ª supported beneath the pattern plate when withdrawn. These conduits are connected by means of suitable conduits 311 to conduits 312 (shown only in part), which are governed by a control valve $v^3$ (Fig. 2) supported upon the main frame A.

The piston 269 and head 272 are again raised by a second operation of the valve 278 and the mold is thereby closed without the pattern therein. When the mold has been closed the sand strips 93 are released. This is accomplished by means of a pair of pins 313 (Figs. 3, 4, 16, 18 and 19) carried upon and extending downwardly from corresponding ends of a pair of bell crank levers 314. These levers are pivotally supported on the main frame at 315 and are adapted to assume a normal position wherein stop pins 314ª secured to the bell cranks engage cross bars 59ª in the cross head 31. When in this position the levers 314 support the pins 313 so that the pins will engage projecting portions 105ᵇ (Fig. 4) of the arms 105 on the sand strip operating mechanisms when the flask is raised. The levers 314 are yieldably retained in this normal position by means of a pair of springs 316.

Inasmuch as it is not desired to release the sand strips during the first ascent of the ram piston when the mold is rammed, means is provided to pivot the bell cranks 314 and thereby withdraw the pins 313 so as not to actuate the sand strip mechanism during the ramming operation. As illustrated herein, this means comprises the arms 317 of the bell crank levers 314, which arms are in the path of movement of a pair of adjustable screws 318 (Fig. 16) carried upon the swingable cope board frame 199. These screws are herein shown in screw threaded engagement with laterally projecting portions 302ª of the brackets 302 which are mounted upon the cross head 198 of the frame 199, so that when the cope board is moved into its operative position above the flask preparatory to the ramming of the mold, the screws 318 engage the arms 317 and swing the levers 314 into an inoperative position wherein the pins 313 are withdrawn laterally of the cope.

With the drag supported in its raised position, the valve 280 is actuated to cause the piston 269 to descend. The head 272 thereupon descends and as the sand strips have been withdrawn the mold is withdrawn from the flask due to its own weight and, positioned upon the drag board $d$, is ready for removal from the machine.

*Mold carrier*

A carrier is preferably provided to remove the completed molds from the machine. As illustrated herein (Figs. 1 to 5 and 15), this carrier is designated generally as M and in its operation is adapted to move upwardly to raise a mold off the ram platens 275, then outwardly over a transfer table (not shown), then downwardly to deposit the mold upon the table, and then rearwardly to its normal position.

In its exemplary form the mold carrier has a frame comprising longitudinal rods 319 and 320 (Fig. 15) secured together in laterally spaced relation by means of a transverse brace rod 321 and a diagonal brace rod 322. These longitudinal rods have inverted V-shaped ways 323 rigid therewith, adjacent the main frame of the machine which engage rollers 324, and the rearwardly extending rod 320 has an inverted V-shaped way 325 rigid therewith adjacent its rear end which is adapted to engage a roller 326 mounted upon the frame of the cam mechanism. The frame is thus mounted for sliding movement forwardly and rearwardly of the main frame A.

The forward ends of the rods 319 and 320 are provided with vertical pivot pins 327 (Figs. 5 and 15) upon which a pair of forwardly extending arms 328 are pivotally mounted. These arms have rearwardly extending portions 329 adapted to engage the adjacent sides of the rods 319 and 320 to limit the inward movement of the arms. Leaf springs 330, secured at one end to the rods 319 and 320 at 331 are adapted to engage the arms 328 so as to normally retain the arms in their inward position and to permit outward pivotal movement of the arms when they engage with the conical head 272 of the ram during an ascent of the said head.

The rollers 324 (Fig. 5) are movably mounted and are adapted to be actuated to raise and lower the front end of the carrier frame. As illustrated in Figs. 1, 5 and 15, the rollers are rotatably mounted upon the free ends of a pair of arms 332 which are secured at their other ends to a shaft 334. This shaft is journaled in a bushing 335 which is preferably integral with the bracket 289 and is operable by means of an arm 339 secured thereto. The arm 339 is adapted to be swung and the frame is adapted to be moved forwardly and rearwardly by the main cam mechanism as hereinafter more fully brought forth.

The mold carrier is preferably provided with a plurality of air discharge openings 336 (Fig. 2) in the arms 328 which openings are adapted to direct air onto the ram platens to clean them. These openings are connected by suitable ducts (not shown) and conduits 337, with a supply conduit 338 (shown in part) containing a control valve $v^4$ (Fig. 2).

Main cam mechanism

The main cam mechanism hereinbefore referred to is adapted to control and operate various parts of the machine in proper sequence. This cam mechanism (Figs. 1 and 20–24) is preferably positioned immediately behind the main frame and as illustrated herein, comprises a power driven shaft 340 journaled in a supporting frame 341 and carrying a plurality of cams, the supporting frame being also adapted to provide a mounting for the followers for the cams.

Thus, as illustrated, the support 341 comprises a pair of frames 342 spaced laterally by means of cross bars 343, 344 and 345, and a cross head 346. The shaft 340 extends transversely of the supporting structure and is journaled in bearing blocks 347 carried one on each frame 342. As shown in the drawings, these bearing blocks are slidable to a limited extent longitudinally of the frames and are provided with screw devices 384 for the purpose of permitting adjustment and alinement of the bearings.

A cam drum 349 is suitably mounted on the shaft 340 to rotate therewith. This drum, in the embodiment of the invention disclosed herein, is adapted to carry a plurality of cams numbered 351 to 378 inclusive, which through followers 351' to 378' inclusive and suitable means connecting the followers with various parts of the machine, are of conformations adapted to operate these parts in the proper manner and sequence, and to hold them in various positions as particularly pointed out hereinafter in connection with the description of the general operation of the machine. The followers are of conventional forms, such as arms, levers or bell cranks, and are provided with rollers pivoted on the ends adjacent the cams and adapted to engage therewith.

Cams 351 to 357 inclusive are provided to actuate the air valves $v^1$ to $v^7$ which are mounted on the rear side of the main frame A (Figs. 2 and 4). As mentioned hereinbefore, valve $v^1$ controls the supply of air to the vibrator 306 on the pattern carrier P' and is adapted to be operated to admit air to the vibrator for the purpose of vibrating the pattern to release it from the drag. Valve $v^2$ controls the air supply to the vibrator 67 on the main sand hopper H, two cams 352 and 352$^a$ being provided so as to actuate the valve twice during the making of one mold. Valve $v^3$ controls the air supply to the nozzles 308 (Figs. 3 and 5) from which air is discharged to clean and dry the pattern when in its rear position. Valve $v^4$ controls the air supply to the openings 336 on the mold carrier (Fig. 3) from which air is discharged to clean the platens 275 of the ram. Valve $v^5$ controls the air supplied to the vibrators 293 carried upon the swingable cope board frame 199. Valve $v^6$ controls the air supplied to the cope board groove 204 to clean the sand away from around the top of the flask. Valve $v^7$ controls the air supplied to the sprue passage 214.

The followers for cams 351 to 357 are in the form of bell cranks 351' to 357' pivoted on a common shaft 350 which is supported upon the cross head 346 by means of brackets 379 and 380. The arms of the bell cranks are connected to the actuating arms of the valves by means of rods 351'' to 357'' inclusive. These followers and rods may be of comparatively light construction inasmuch as their function consists merely in operating the air valves.

Cams 358 and 360 are adapted to lower and raise the drag through the action of the cams on followers 358' and 360' and a single rod 358'' which connects follower 358' to the free end of the arm 116$^a$ of the shaft 117 and operates through the links 114 to raise the drag. The followers 358' and 360' are mounted upon spaced pivots 381 and 382 secured to a bifurcated bracket 383 extending from the cross head 346 and are provided with interengaging segmental gear portions 384 and 385. By this interlocking arrangement, movement of the follower 358' counter-clockwise by cam 358 actuates the rod 358'' to lower the drag and movement of the follower 360' by the cam 360 actuates follower 358' clockwise, thereby actuating rod 358'' through the gears 384 and 385 and follower 358' to raise the drag.

Cams 359 and 362 clamp and unclamp the drag board dogs 180 through followers 359' and 362' and a rod 362'' which connects to one end of the arm 82$^a$ which is secured to the shaft 82 on the machine frame. The follower 359' is of the arm type, and is fixed on a pivot shaft 386 journaled in a bifurcated bracket 387 which extends upwardly from the cross head 346. The follower 362' is a lever fixed intermediate its ends to a shaft 388 and geared to the follower 359' by means of segmental gears 389 so that the single rod 362'' may be used both to clamp and release the drag board clamps.

Cams 361, 361$^a$, 363, and 363$^a$ are adapted to close and open the gates G of the main hopper H twice during the formation of a mold. These cams are provided with followers 361' and 363' (Fig. 22) similar in construction to the followers 358' and 360', being mounted upon the spaced pivots 391 and 392 on a bracket 383 and interconnected by means of segmental gears 393. A rod 361'' connects one end of the follower 361' to the free end of the arm 47 on the hopper gate so that the gate G is opened when cam 363 or 363ª actuates the follower 363', and is closed when cam 361 or 361ª actuates the follower 361'.

Cams 364 and 366 are provided to operate the drag board pusher frame 150. Follower 364' and follower 366' (Fig. 20) are substantially duplicates of followers 361' and 363' as shown in Fig. 22 and are connected to the pusher frame 150 by means of a single rod 364" extending from the follower 364' to the said frame (Fig. 1). As shown in Fig. 22 the cam 364 extends practically throughout the periphery of the drum 349 so as to hold the frame 150 in its forward inoperative position except for the short period required to apply a drag board to the flask.

Cams 365, 365ª, 368, and 368ª are adapted to actuate the air valves 278 and 280 (Fig. 15) for the ram, cams 365 and 365ª to raise the ram and cams 368 and 368ª to lower it. Follower 365' for cams 365 and 365ª is a bell crank pivotally mounted on a bracket 394 supported upon the cross bar 344 of the frame 341. A rod 365" is adapted to connect one end of this follower with the arm 288 on the valve 278 (Fig. 1). Follower 368' (Fig. 23) is substantially a duplicate of follower 365', and is mounted upon a similar bracket 394ª and is connected with the arm 288 (Fig. 15) of the valve 280 by a similar rod 368".

Cams 367 and 369 operate the swingable cope board frame 199 rearwardly and forwardly by means of followers 367' and 369' (substantially duplicates of followers 361' and 363'), and a single rod 367" connected between the follower 367' and the frame 199 (Fig. 1). The cam 369 actuates follower 367' through the follower 369' to swing the frame 199 forwardly to place the cope board C over the flask, and cam 367 is adapted to actuate the follower 367' to return the cope frame to its rear and inoperative position.

Cams 370, 371 and 372 (Fig. 23) are provided to actuate the mold carrier M. Thus cam 370 is adapted to engage a bell crank follower 370' which is connected to the mold carrier rod 320 by a rod 370" to move the carrier forward. The follower 372' for cam 372 is interlocked with the follower 370' by means of segmental gears 395 similar to those on followers 358', and 360' and is adapted to move the follower 370' in the opposite direction to return the mold carrier rearwardly. Cam 371 has a follower 371' which, through a rod 371" is connected to the free end of the arm 339 (Fig. 1) on the operating shaft 334 of the mold carrier lifting rolls 324, and is adapted to raise and lower the said rolls and thereby the front end of the mold carrier.

Cams 373 and 375 (Fig. 24) actuate the pattern carrier P' forwardly and rearwardly by means of similar interlocked followers 373' and 375' and a single rod 373" which connects follower 373' with the member 118 of the pattern carrier.

Cams 374 and 374ª are adapted to close the gate G' of the measuring hopper H' by means of a follower 374' and a rod 374" which connects said follower to the arm 52 on the operating shaft for the gate. This follower is pivotally mounted in a bifurcated bracket 396 which is secured to the cross head 346.

Cams 376 and 378 operate through followers 376' and 378' to pivot the flask. Thus, cam 378 through its follower 378', and a rod 376", is adapted to actuate the arm 220 on the cope arms 86 to place the drag uppermost and cam 376 acts through its follower 376', which is geared to the follower 378' by means of segmental gears 397, to pivot the flask to place the cope uppermost.

Cam 377 is provided when the pattern plate shown in Figs. 14ᵇ and 14ᶜ is used. This cam operates through the follower 377' and the rod 377" to actuate the mechanism on the pattern plate. The follower 377' is pivotally mounted in the bracket 396 and the rod 377" is pivotally connected to the follower and to one end of the lever 415 carried on the cope supporting frame.

*General operation*

When the machine parts are in their normal position the pattern plate P is on the pattern carrier P', the pattern carrier is in its forward position where it supports the pattern plate betwen the cope C and the drag D, the cope is up with the sand strips 93 out, and the drag board clamps 180 released, the cope board c is back, the drag board pusher 155 is forward, the mold carrier M is back and down, the ram piston 269 is down, the measuring hopper H' is filled, and the gates on both hoppers are closed. With the sand supply system in operation, compressed air available in the supply lines, and a supply of drag boards d in the hopper 140, rotation of the main cam shaft 340 in a clockwise direction by any suitable means (not shown) causes the parts to be operated in the proper sequence.

Thus, in the initial position as shown in Figs. 20–24, the flask has closed with the pattern plate P in place between the cope and drag sections. This occurred when cam 360 engaged follower 360', the drag then being raised through the action of this follower, gears 384 and 385, follower 358', rod 358", arm 116ª, shaft 117, arms 116, and links 114. As the drag was raised it picked the pattern plate P off the pattern carrier P' and carried the plate upward until it was clamped between the drag and the cope sections. The pivots 115 of the drag and the pivot bearings 85 of the cope are then alined so as to permit a roll over of the flask.

The flask is then pivoted 180° in a clockwise direction looking at Fig. 18, to position the drag uppermost, when cam 378 engages follower 378'. This follower actuates rod 376" and moves the rod to its rear position, thus extending the link 230 and positioning the flask as shown in Fig. 19. During this inverting or roll-over movement, the cope and drag are clamped together independently of the clamping effect due to the relative positions of their supporting frames, the sand strips are closed in and, just before completing the roll-over, parting sand is discharged onto the pattern plate and immediately thereafter molding sand is discharged into the drag. The clamping of the cope to the drag occurs when the rollers 132 carried on the cope engage the cams 134 formed upon the drag supporting links 114 (Fig. 11). Similarly the sand strips are closed in when the rollers 108 carried on the arms 105$^a$ of the sand strip operating bell cranks 105 engage cam surfaces 109. The parting sand is discharged onto the pattern plate by an operation of the bellows device. This operation occurs when the arm 256 (Fig. 4) through the link 260, bell crank 257, link 264, rod 262, link 263, and arm 255, oscillates the shaft 240 so as to raise and release the rod 76 by means of the dog 243. The molding sand is discharged into the drag immediately after the actuation of the bellows device, when the oscillation of the shaft 240 has caused the dog 251 to engage and actuate the arm 247 (and thereby the link 248) to release the latches 53. Thus the drag side of the pattern has been covered with a coat of parting sand, and the drag filled with a measured quantity of molding sand and is ready for the application of a drag board.

A drag board $d$ is then moved into place on the filled drag while at the same time the trap doors G' on the measuring hopper are closed. The drag board is applied when the cam 366 engages follower 366', and pivots the swingable frame 150 by means of the follower 364 and rod 364". The movement of this frame causes the gate 157 to strike off excess sand on the drag and also causes the gate portion 157$^a$ and the pusher bar 155 to move the lowermost drag board in the hopper 140 onto the drag section. Cam 364 then engages follower 364' which actuates the rod 364" to move the frame 150 back to its normal forward position and to hold it in that position. During this return movement of the swingable frame the gate 157 is raised by means of the cam mechanism connected therewith.

The trap doors G' are closed when the cam 374 engages the follower 374' and actuates the rod 374".

The drag board $d$ is then clamped to the filled drag section by means of the dogs 180 when the cam 359 engages the follower 359' and actuates the toggle links 187 through the intervening connecting mechanism which includes the follower 362', rod 362", arm 82$^a$, shaft 82, arms 194, links 193, arms 192, teeth 197 and 196, shafts 183, bevel gearing 185, shafts 184, and arms 186. At approximately the same time the gates G on the main hopper H are opened through the action of the cam 363, followers 363' and 361', rod 361", and arm 47, and the vibrator 67 on this hopper is actuated when the cam 352 engages the follower 352' and operates the valve $v^2$ through the rod 352". The gate G on the main hopper H is closed when the cam 361 engages the follower and thereby actuates the rod 361".

The flask is again rolled over, this time to position the cope section uppermost, this movement of the flask being accomplished by means of the cam 376 and the follower 376' which acts through the follower 378' to move the rod 376" to its forward position, as shown in Fig. 18. During this roll-over movement, and just before its completion, parting sand is discharged onto the cope side of the pattern plate followed immediately by a discharge of molding sand into the cope by a second operating of the bellows and measuring hopper gate trip devices by the arm 256, as hereinbefore described.

The cope board frame is then swung forwardly through the action of the cam 369, followers 369' and 367', and rod 367", so as to position the cope board vertically above the cope. At about the same time the trap doors G' on the measuring hopper H' are closed when the cam 374$^a$ engages follower 374' and actuates the shafts 49 through the rod 374" and the arm 52, and air is discharged from the openings 336 in the mold carrier arms 328 when the cam 354 engages the follower 354' and actuates the valve $v^4$ through the rod 354". The gates G on the main hopper are again opened, this time through the action of the cam 363$^a$ on follower 363' and the hopper is vibrated through the action of the cam 352$^a$ on follower 352', as hereinbefore described.

With the cope board positioned above the cope the mold is ready to be rammed, and upon actuation of the valve 278 by means of the rod 365" when the cam 365 engages the follower 365', pressure fluid is admitted to the ram cylinder through the conduit 277 and the piston ascends. As the mold is rammed the drag board clamps 180 are released through the action of the cam 362 on the follower 362', and rod 362", and air is discharged around the cope board $c$ and the sprue pins 129 when the cams 356 and 357 actuate the valves $v^6$ and $v^7$ through the followers 356' and 357' and the rods 356" and 357". Cam 368 through the follower 368' and the rod 368" then actuates the valve 280 to admit air to cause the ram piston to descend. The pattern is rapped when the cam 355 engages the follower 355' and operates the valve $v^5$ through the rod 355" to admit air to the vibrators 293.

The cope is stopped in its descent when the cope supporting frame arms 80 engage the stop screws 304. The pattern is then drawn from the cope and continues with the drag until the pattern plate P engages the screws 124 on the pattern carrier P'. As the pattern plate engages these screws, the pattern carrier is vibrated by the vibrator 306 when the cam 351 actuates the follower 351' to open the valve $v^1$ by means of the rod 351". As the ram piston continues in its descent with the drag thereon, the pattern is drawn from the drag.

The cope board c is moved to its rear position when the cam 367 engages the follower 367' and actuates the swingable frame 199 through the rod 367", and the pattern carrier P' is moved rearwardly by the action of the cam 375 on the rod 373" through the followers 375' and 373'. With the pattern carrier in its rear position, the pattern and pattern plates are cleaned and dried by air discharged from the nozzles 308 above and below the pattern plate when the valve $v^3$ is actuated by means of the cam 353, follower 353', and rod 353".

The mold is then closed without the pattern plate therein when the cam 365ª engages the follower 365', this causing the ram piston to be raised as hereinbefore described. The cope board then being in its rear position, the pins 313 engage the sand strip operating mechanisms and withdraw the sand strips from the cope. The drag and thereby the cope sections of the flask are then supported in their raised positions by means of the cam 360ª acting on the follower 360', and the intervening connections with the drag section, and as the ram descends upon a second actuation of the valve 280 by the cam 368ª, the mold is withdrawn from the flask and is ready for removal from the machine.

The completed mold, positioned on a drag board, is then removed from the machine by means of the mold carrier. Thus when cam 371 engages follower 371', the shaft 334 is rocked by means of the rods 371" and the arm 339. The rollers 324 are thereby raised into engagement with the inverted V-shaped ways 323 on the mold carrier and elevate the front portion of the mold carrier. During this elevation of the forward part of the mold carrier, the arms 328 of the carrier lift the completed mold from the platens 275 on the piston head 272. Cam 370 then engages follower 370' and through the rod 370" moves the mold carrier forwardly. The forward portion of the mold carrier is then lowered when the follower 371' rides off the cam 371 and the mold carrier thereon may be placed upon a suitable transfer table (not shown). The mold carrier is then withdrawn to its rear position when the cam 372 engages follower 372' and through the segmental gears 395 and follower 370' actuates the rod 370". The various parts of the machine are then in position to ram another mold.

I claim as my invention:

1. An automatic molding machine comprising, in combination, a main frame, a pattern plate supported on said frame, a flask comprising cope and drag sections movably mounted on said frame, sand supply devices supported above said flask, a ramming device supported below said flask, a drag board supported on one side of said flask, a cope board supported on another side of said flask, means to assemble said flask with said pattern plate therebetween, means to pivot said flask to position the drag section uppermost, means to operate said sand devices to discharge sand into said drag section, means to move said drag board onto said drag section, means to clamp said drag board onto said filled drag section, means to position said flask with the cope uppermost, said sand device operating means being adapted to again discharge sand into the cope section, means to move said cope board onto the cope section, means to raise said ram to ram said flask, means to lower said ram, means including a portion of said assembling means to part said flask sections to draw said pattern, means to withdraw said pattern from between said flask sections, said ram actuating means being again operable to raise said ram to close said flask, and means to retain said flask in a raised position to permit the completed mold to descend with the ram.

2. An automatic molding machine comprising, in combination, a main frame, a flask comprising cope and drag sections independently pivotally mounted on said frame and adapted when assembled to be pivoted on a common axis, a pattern plate supported on said frame, means to insert said pattern plate between said flask sections, means to assemble said flask sections, means to fill sand into said drag section, a support, a drag board on said support, means to apply said drag board to said filled section, and means to clamp the drag board to said section.

3. A molding machine having, in combination, a main frame, a pivotal flask comprising cope and drag sections supported on said frame, a drag board support, a drag board a swingable frame pivoted on said main frame and adapted to move a drag board from said support onto said drag section, a second swingable frame carrying a cope board movable to apply said board to the cope section, means adapted to supply sand to said flask sections, means to ram said flask sections, and a cam mechanism mounted to the rear of said main frame comprising cam means connected to said machine elements and adapted to actuate them.

4. A molding machine comprising, in combination, a main frame, a pivotal flask comprising cope and drag sections supported on said frame, a drag board support, a drag board, a swingable frame carried on said main frame and adapted to move a drag board from said support onto said drag section, and a second swingable frame carrying a cope board movable to apply said board to the cope section.

5. In a molding machine, the combination of a main hopper, a measuring hopper, a parting-sand hopper, a pivotal flask, a distributing chute intermediate the measuring hopper and flask, means to pivot said flask, means operable by the flask in its pivotal movement to discharge first sand from the parting-sand hopper into one section of the flask, and second sand from the measuring hopper into said section of the flask, a board, and means operable upon completion of said sand discharge to apply said board to the filled section of the flask.

6. In a molding machine, the combination of a main sand hopper, a parting-sand hopper, a pivotal flask, means to pivot said flask, means to discharge sand from said parting-sand hopper into the flask, means to discharge sand from said main hopper into the flask, a support, a board on said support, means to move said board from said support onto said flask, and means to clamp said board to the flask.

7. An automatic molding machine comprising, in combination, a flask having cope and drag sections, a pattern-carrying plate, means for supplying molding sand in successive measured charges, sand ramming means, pattern vibrating means, and operating mechanism for the flask, the pattern plate, the sand discharge means, the ramming means, and the vibrating means, whereby to assemble the pattern plate clamped between the two flask sections, to present and fill the flask sections successively with sand, ram the sand, vibrate the pattern, withdraw the pattern, and reassemble the sections of the flask to complete the mold.

8. An automatic molding machine having, in combination, a flask having cope and drag sections, a pattern-carrying plate, a drag board supply means, means operable to move the pattern plate into and out of operative relation to the flask sections, means for supplying molding sand in successive measured charges, ramming means, pattern vibrating means, and operating mechanism adapted to effect the operation of the said several means in timed relation whereby to form the mold.

9. An automatic molding machine having, in combination, a flask having cope and drag sections, a pattern-carrying plate, drag board supplying means, means for positioning the pattern plate into and out of operative association with the flask sections, means for supplying successive charges of measured sand to fill the flask sections, means for moving the sections of the flask toward and from each other, and also rotatably as a unit, a cope board movable into and out of operative relation to the flask sections, means coacting with the cope board to compress the sand on opposite sides of the pattern plate, to withdraw the pattern, to reassemble the sections of the mold, and to strip the mold from the flask sections, and operating mechanism adapted to effect the operation of said several means in a predetermined timed relation to form a mold.

10. In a molding machine comprising a main frame and a flask section supported thereon, the combination of a drag board hopper having a discharge opening adjacent said flask section, a swingable frame, a pusher bar adapted to move a board from said hopper onto said flask section, means to support said bar on said swingable frame, a gate adapted to close said hopper pivotally mounted on said means, said gate during movement of said pusher bar being adapted to strike off excess sand from said flask section, and means adapted to pivot said gate during the return movement of said pusher bar.

11. In a molding machine of the character described, the combination of a main frame, a flask comprising cope and drag sections supported from said frame, a hopper adapted to receive drag boards, a swingable frame carrying a pusher bar adapted to move a drag board from said hopper onto the drag, and means on said swingable frame adapted to strike off excess sand from the drag during such movement.

12. In a molding machine comprising a main frame and a flask section supported thereon, the combination of a drag board hopper having a discharge opening adjacent said flask section, a swingable frame pivotally mounted on said main frame, a gate for said discharge opening pivotally mounted on said swingable frame and adapted when said frame is in its normal position to close said opening, and means on said swingable frame adapted to move the lowermost board in said hopper during a swinging movement of said frame.

13. In a molding machine comprising a main frame and a flask section supported thereon, the combination of a drag board hopper having a discharge opening adjacent said flask section, a swingable frame pivotally mounted on said main frame, a gate for said discharge opening pivotally mounted on said swingable frame and adapted when said frame is in its normal position to close said opening, means on said swingable frame adapted to engage the lowermost board in said hopper during a swinging movement of said frame, and means adapted to retain the next succeeding drag board displaced from the bottom of the hopper until said swingable frame resumes its normal position.

14. In a molding machine comprising a main frame and a flask section supported thereon, the combination of a drag board hopper having a discharge opening adjacent said flask section, a swingable frame pivotally mounted on said main frame, a gate for said discharge opening pivotally mounted on said swingable frame and adapted when said frame is in its normal position to close said opening, means on said swingable frame adapted to engage the lowermost board in said hopper during a swinging movement of said frame, said gate being adapted in the movement of said frame to strike off excess sand from said flask section.

15. An automatic molding machine comprising, in combination, a main frame, a flask comprising cope and drag sections movably mounted on said frame, a pattern plate, means to insert said pattern plate between the cope and the drag, means to assemble the flask with the pattern plate clamped therebetween, means to cause a roll-over of the flask to position the drag uppermost, a drag board hopper, means automatically operable to move a drag board from said hopper onto the drag, and means to clamp said board to the drag.

16. In a molding machine wherein a flask comprising a drag section is permanently mounted on a main frame, the combination of a drag board hopper, adapted to receive a drag board, a swingable frame pivoted to said main frame, and means on said swingable frame adapted in a swinging movement of said frame to move a board from said hopper onto said drag section.

17. In a molding machine wherein a flask section is supported on a frame, the combination of a board, means to support said board, and means operable to move said board from said support onto said flask section.

18. In a molding machine, the combination of a frame, a flask section supported on said frame, means to support a plurality of drag board, and means to move said drag boards one at a time from said support onto said flask section.

19. In an automatic molding machine, the combination of a main frame, a flask section supported thereon, a drag board hopper adapted to receive a plurality of drag boards, and means operable to move the innermost of the drag boards in said hopper onto said flask section.

20. In a molding machine, the combination of a main frame, a flask section movably supported thereon, a drag board, a stationary support for said drag board, means operable to move said drag board from said support onto said flask section, and means operable to clamp said board to said flask section.

21. In a molding machine, the combination of a pivotally mounted flask section, a hopper adapted to support a plurality of drag boards, means operable to move the innermost drag board in said hopper onto said flask section, and means operable to clamp said drag board to said section.

22. In a molding machine, the combination of an invertible flask comprising cope and drag sections, means to support a plurality of drag boards, means operable to move a drag board from said support onto said drag section when the drag is uppermost, and means carried on said cope section operable to clamp said board to the drag section.

23. An automatic molding machine comprising, in combination, a frame, a flask comprising cope and drag sections movably mounted on said frame, a pattern plate, means to insert said pattern plate between said flask sections, means to assemble the flask with the pattern plate clamped therebetween, means to invert the flask to position the drag uppermost, a drag board support, means to move a drag board from said support onto the drag, means to clamp said board to the drag, and means including a portion of said inverting means to reinvert the flask to position the cope uppermost.

24. In a molding machine, the combination of a pivotal flask comprising a filled drag section, a drag board, means to apply said drag board to said drag section, means to clamp said drag board to the drag section, means to actuate said clamping means including means to lock the clamping means in their clamping position, and means including a portion of said actuating means adapted to release said clamping means after a roll-over of the flask.

25. In a molding machine, the combination of a filled drag section of a flask, a drag board on said drag section, a plurality of dogs adapted to move said board inwardly of and to clamp said board on said drag, and means to actuate said dogs including means to lock the dogs in their clamping position.

26. In a molding machine, the combination of a pivotal flask comprising a filled drag section, a drag board on top of said drag section, means operable to clamp said board on top of said section, and means adapted automatically to release said clamping means after a roll-over of the flask.

27. An automatic molding machine comprising, in combination, a flask having cope and drag sections independently supported on and pivotal about alined axes, means to apply a drag board to said drag section, a plurality of dogs adapted to clamp said drag board to the drag, means operable when the drag is uppermost to actuate said dogs, said means including a lost motion connection adapted to permit a roll-over of the flask without releasing said dogs.

28. In a molding machine, the combination of a main frame, a main hopper, a measuring hopper, a parting-sand hopper, a flask invertibly mounted on said frame, a distributing chute intermediate the measuring hopper and the flask, means to invert said flask, means operable by the flask during this movement thereof to discharge, first, sand from the parting-sand hopper into the flask and, second, sand from the measuring hopper into the flask, a drag board, means to support said drag board, and means operable upon completion of said discharges to move said board onto the flask.

29. In a molding machine, the combination of a measuring hopper, a parting sand hopper, a pivotal flask, a distributing chute intermediate the measuring hopper and the flask, means to pivot said flask, and means operable by the flask in its pivotal movement to discharge sand from said hoppers into the flask.

30. In a molding machine, the combination of a main sand hopper, a measuring hopper beneath said main sand hopper, a gate on said main sand hopper adapted to be opened to discharge sand into said measuring hopper and adapted when closed to strike off a predetermined amount of sand in said measuring hopper, a flask pivotally mounted beneath said measuring hopper, means to pivot said flask, and means operable by the flask in its pivotal movement to discharge sand from the measuring hopper into the flask.

31. In a molding machine, the combination of a hopper, a flask pivotally mounted beneath said hopper, means to fill said hopper with a predetermined quantity of sand, and means operable during the pivotal movement of said flask to discharge said predetermined quantity of sand into the flask.

32. In a molding machine, the combination of a pivotal flask comprising cope and drag sections, a pattern plate positioned therebetween, a parting-sand hopper, and means operable to discharge parting-sand from said hopper into a thin film on said pattern plate.

33. In a molding machine, the combination of a pivotal flask comprising cope and drag sections, a pattern plate positioned intermediate said sections, a parting-sand hopper, a bellows device adapted to blow sand from said parting-sand hopper onto said pattern plate, and means operable during the pivotal movement of said flask to actuate said bellows device.

34. In a molding machine, the combination of a sand hopper, a measuring hopper positioned beneath said sand hopper, a flask comprising cope and drag sections movably mounted beneath said measuring hopper, a gate on said sand hopper adapted when open to permit sand to fill said measuring hopper and adapted when closed to strike off a predetermined quantity of sand in said measuring hopper, and means operable to discharge said predetermined quantity of sand onto one of said flask sections.

35. In a molding machine, the combination of a parting-sand hopper, a measuring hopper, a pivotal flask, and means operable by said flask during its pivotal movement adapted to discharge sand successively from said hoppers into the flask.

36. In a molding machine, the combination of a pivotal flask adapted to be oscillated through 180°, a sand hopper, a discharge gate on said hopper, means normally adapted to hold said gate closed, and means connected with said flask adapted to release said holding means once during each swing of said oscillatory movement.

37. In a molding machine, the combination of a pivotal flask adapted to be oscillated through 180°, a sand hopper, a discharge gate on said hopper, a latch device normally adapted to hold said gate closed, and means adapted to release said latch device once during each swing of said oscillatory movement, said means comprising a trip device having a rock shaft, and means to oscillate said rock shaft to actuate said trip device including an arm secured to said flask.

38. In a molding machine, the combination of a pivotal flask adapted to be oscillated through 180°, a measuring hopper, a discharge gate for said hopper, a latch device for said gate, a parting-sand hopper, a bellows device adapted to be actuated to discharge parting sand from said hopper, a rock shaft, a pair of trip devices adapted to release said latch device and to actuate said bellows device, said trip devices including dogs carried on said rock shaft, and means to oscillate said rock shaft twice during an oscillatory movement of said flask.

39. In a molding machine, the combination of a sand hopper, means for automatically placing measured quantities of sand in said hopper, a pivotal two-section flask beneath said hopper, means to pivot said flask, and means operable by the flask in its pivotal movement to discharge sand from said hopper into the then uppermost section of the flask.

40. In a molding machine, the combination of a sand hopper, a pivotal flask, and means operable by said flask in its pivotal movement to discharge sand from the said hopper into the flask.

41. In a molding machine, the combination of a pivotal two-section flask, means carried on one of said sections adapted to be moved into that section to retain sand therein, means operable during the pivotal movement of said flask to close-in said retaining means into said section, said means including a mechanism adapted to hold said retaining means in said closed-in position during a reverse pivot of the flask.

42. In a molding machine, the combination of a pivotal flask comprising cope and drag sections, a plurality of sand strips movably mounted on said cope adapted in their closed-in position to retain sand in said section, and cam actuated means operable during a roll-over of said flask to close-in said sand strips.

43. In a molding machine, the combination of a pivotal flask comprising cope and drag sections, a plurality of sand strips pivotally mounted on said cope adapted in their closed-in position to retain sand in said section, and cam actuated means operable during a roll-over of said flask to close-in said sand strips, said means including a toggle device adapted to retain said sand strips in their closed-in position.

44. In a molding machine, the combination of a pivotal flask comprising a cope section, a plurality of sand strips movably mounted on said cope section adapted in their closed-in position to retain sand in said section, and means supported axially of said flask adapted to close-in said sand strips during a pivotal movement of the flask.

45. In a molding machine, the combination of a sand hopper, a flask comprising cope and drag sections, means to cause a roll-over of said flask, sand strips carried on said cope section and insertable therein, means to insert said sand strips, and means adapted to discharge sand from said hopper into said cope section.

46. In a molding machine, the combination of a pivotal flask comprising cope and drag sections, means adapted to pivot said flask, and means operable during a pivotal movement of said flask to clamp said cope and drag sections together.

47. In a molding machine, the combination of a hopper, a parting-sand hopper, a two-section flask, means to pivot said flask, sand strips carried movably on one of said sections, means operable during said pivotal movement to insert said sand strips into said sections, means to discharge, first, sand from the parting-sand hopper into the other section and, second, sand from the hopper into said other section, a board, means to apply said board to said filled sections, and means to clamp said board thereto.

48. In a molding machine, the combination of a hopper, a parting-sand hopper, a two-section flask, means to pivot and re-pivot said flask, sand strips carried movably on one of said sections, and means operable during said pivotal movement to insert said sand strips into said section, said means remaining inoperative during said re-pivotal movement.

49. In a molding machine of the character described, the combination of a pivoted cope frame, a drag frame movable toward and from said cope frame, a flask comprising cope and drag sections pivotally mounted on said respective frames, a pattern plate adapted to be inserted between said sections, means to assemble said flask with the pattern plate inserted between said sections, the pivotal axes of said sections then being alined, means to pivot said flask sections about said independent and alined axes, and means operable during said pivotal movement to clamp said sections together.

50. A molding machine comprising, in combination, a main frame, a flask comprising cope and drag sections, a cope frame pivoted on said main frame, a drag frame slidably connected to said cope frame for movement toward and from the cope, said cope and drag being pivotally mounted on the respective frames, means to actuate said frames to aline said pivots and to retain said pivots in said alined position.

51. A molding machine comprising, in combination, a main frame, a flask comprising cope and drag sections, a cope frame pivoted on said main frame carrying said cope, a drag frame slidably connected to said cope frame and carrying said drag for movement toward and from the cope, said cope and drag being pivotally mounted on their respective frames, means to actuate said frames to aline said pivots, means to pivot said flask, and means operable during the pivotal movement of the flask to clamp said sections together.

52. In a molding machine, the combination of a frame, an invertible flask comprising two sections movably and permanently mounted on said frame, a pattern plate, a pattern carrier adapted to support said plate intermediate said flask sections, and means operable to assemble said flask sections with the pattern plate clamped therebetween.

53. In a molding machine, the combination of a frame, cope and drag flask sections pivotally and movably mounted on said frame, means operable to move one of said sections into axial alinement with the other, means operable to pivot said sections simultaneously when in alinement, and means operable during said pivotal movement to clamp said sections together.

54. A molding machine comprising, in combination, a frame, a flask having cope and drag sections independently and pivotally mounted on said frame and adapted when adjacent each other to have their pivot axes in alinement, means operable to pivot said sections simultaneously, and means comprising a cam supported on one of said sections, and a follower supported on the other section adapted to clamp said sections together during said pivotal movement.

55. A molding machine comprising, in combination, a frame, an invertible flask having two sections permanently and movably mounted on said frame for movement toward and from each other, and means automatically operable to assemble said flask sections.

56. A molding machine comprising, in combination, a frame, a flask comprising cope and drag sections permanently mounted on said frame to pivot about independent axes, and means to move said sections to aline said axes.

57. A molding machine having, in combination, a flask comprising cope and drag sections, a pivotal frame supporting said cope, means supporting said drag slidable on said pivoted frame, and means adapted to move said drag supporting means.

58. A molding machine comprising, in combination, a flask having cope and drag sections pivotal on independently movable axes, and means operable to aline said axes.

59. A molding machine comprising, in combination, a flask having cope and drag sections pivotal on independent axes, means to aline said axes, and means operable when said axes are alined to cause a roll-over of the flask.

60. A molding machine comprising, in combination, a frame, a flask having a plurality of sections permanently and movably mounted on said frame, a pattern plate supported upon said frame, means to assemble said flask sections with said pattern plate therebetween, and means to invert and to re-invert said flask.

61. A molding machine comprising, in combination, a frame, a plurality of flask supporting frames movably mounted on said frame, a flask comprising a plurality of sections permanently mounted one each on said supporting frames to pivot about independent axes, and means to move said supporting frames to aline said axes.

62. A molding machine comprising, in combination, a frame, a flask comprising cope and drag sections movably mounted on said frame, a pattern plate carried movably on said frame, and adapted to be inserted between said sections, means to insert said plate, means to close said sections upon said plate, means to position the closed flask with the drag uppermost, means to fill sand into said drag, a drag board, means to apply said drag board to the filled drag, means to clamp said board onto the drag, means including a portion of said positioning means to invert the flask, a cope board carried movably on said frame, means to move said cope board on the over-filled cope, and means to ram said flask.

63. In a molding machine, the combination of a support, a flask, a cope board permanently but movably mounted on said support, a pattern plate movably mounted on said support, sprue pins carried permanently on said plate, means on said cope board adapted to cooperate with said pins to form a sprue, means to discharge air around said parts to drive out loose sand, and means comprising a plurality of nozzles positioned along the periphery of the cope board adapted to discharge air therefrom.

64. In a molding machine, in combination, a flask, a drag board, means to apply said drag board to the flask, means to clamp said drag board thereon, a cope board movable to a position adjacent the flask, a ram adapted to ascend to ram the flask, and means adapted to clean the platen of the ram before ramming.

65. In a molding machine, the combination of a flask comprising cope and drag sections, a pattern plate adapted to be inserted between said sections, a pattern carried on said pattern plate, means adapted to withdraw said pattern plate from between the sections, and means operable when the pattern plate is in its withdrawn position to discharge air to clean and dry the pattern and plate.

66. In a molding machine, in combination, a flask having a cope section movably mounted on said frame, a cope board movable into and out of a position above said cope, and means to move said cope board onto said cope section, said cope board having air discharge ducts therein around the peripheral edge thereof.

67. A molding machine comprising, in combination, a main frame, a flask comprising cope and drag sections movably mounted on said frame, a pattern plate positioned intermediate said flask sections, a cope board carried on a cope board frame swingably mounted on said main frame into and out of a position wherein the cope board is upon said cope, a vibrating device carried on said cope board frame, and means on said cope adapted to engage said pattern plate and said vibrating device when the cope board is positioned upon the cope.

68. In a molding machine, the combination of a flask comprising cope and drag sections, a pattern plate positioned therebetween, a cope board movable into and out of a position above said cope, a sprue pin on said pattern plate, a hollow conical device carried movably on said cope board and adapted to admit and to surround the upper end of said sprue pin.

69. In a molding machine, the combination of a flask comprising cope and drag sections, a pattern plate positioned therebetween, a cope board movable into and out of a position above said cope, a sprue pin on said pattern plate, a hollow conical device carried on said cope board and adapted to admit and to surround the upper end of said sprue pin, a chamber formed in said cope board above said conical device, an exhaust port from said chamber, and means to discharge compressed air into said chamber.

70. In a molding machine, the combination of a flask, a pattern plate therein, a cope board carried on a frame movable into and out of a position above said flask, a pair of arms pivoted at one end thereof to said frame, a pair of vibrating devices positioned on the free ends of said arms, and means carried on said flask and in engagement with said pattern plate and said arms when the cope board is above the flask.

71. In a molding machine, the combination of a main frame, a flask comprising a cope section mounted on said main frame, sand retaining devices adapted to be moved into and out of said cope section, means adapted to move said sand retaining devices into said cope section and to lock them in that position, means to move said cope vertically on said frame, means on said frame adapted to release said sand retaining devices during such vertical movement of the cope, and a cope board on said frame movable into and out of a position above said cope, said cope board when moved into a position above the cope being adapted to withdraw said releasing means.

72. In a molding machine, the combination of a two-part flask, a pattern plate adapted to be inserted between said parts, a movable pattern carrier adapted when in one position to support said plate intermediate said parts and when in another position to withdraw said plate from between said parts, and means operable when said pattern plate is in its withdrawn position to discharge compressed air thereon.

73. In a molding machine, the combination of a flask, a drag board hopper, a drag board in said hopper, a frame operable to move a drag board from said hopper onto said flask, and a gate on said frame adapted normally to close an outlet in said hopper and adapted during the movement of said frame to strike excess sand from the top of said flask.

74. In a molding machine, the combination of a flask, a drag board hopper adapted to receive a plurality of drag boards, said hopper having an outlet through which the innermost drag board may be removed, a frame operable to move a drag board from said hopper onto said flask and having a gate thereon adapted normally to close said outlet, and means to raise said gate during a return movement of said frame comprising a follower connected to the gate, a stationary cam adapted to actuate the follower, and means adapted to guide the follower into engagement with said cam.

75. In a molding machine, the combination of a measuring hopper, a flask comprising a plurality of sections, means to support said flask below said measuring hopper with said sections locked together, means operable automatically to present said sections successively beneath said hopper and means to fill said hopper intermediate two successive positionings of said flask.

76. In a molding machine, the combination of a pivotal flask comprising a cope section, sand retaining means for said cope section comprising a pair of strips supported along the sides of the flask for movement into and out of the flask, and means to actuate said supports comprising a follower connected therewith and a cam adapted to be engaged by said follower during pivotal movement of said flask.

77. In an automatic molding machine, the combination of a frame, a flask comprising cope and drag sections movably mounted on said frame adapted to be pivoted about a common axis, and sand retaining means for said cope section, said means comprising a pair of sand strips adapted to be moved into and out of said cope sections, a pair of bell cranks pivotally mounted at each end of said flask and carrying said strips, a toggle-like device between the corresponding ends of each pair of bell cranks adapted to lock the sand strips in their closed-in position, and means comprising a follower secured to one of said bell cranks and a cam stationary relative to said common axis adapted to close-in said strips during the pivotal movement of said flask.

78. In a molding machine, the combination of a frame, a pivotal flask comprising a drag section mounted on said frame, a drag board for said drag section, a plurality of dogs adapted to clamp said drag board upon said drag section, means to operate said dogs to move them into their clamping position including a lost motion device adapted to permit a roll-over of said flask, said lost motion device comprising a quadrantal tooth movable with said flask during said roll-over movement, and a second quadrantal tooth adapted to actuate said first tooth.

79. In a molding machine, the combination of a frame, a cope frame movably mounted on said frame, a cope section of a flask carried on said cope frame, a pair of slides movable vertically on said cope frame, a drag section of a flask carried between said slides, and means to move said slides to carry said drag toward and from said cope.

80. In an automatic molding machine, the combination of a frame, a flask comprising a plurality of sections movably mounted on said frame, a pattern plate, means to part and assemble said flask sections, means to insert said pattern plate between said flask sections when parted, a device mounted on said pattern plate adapted to be operated to form a recess in the wall of a mould, and means carried on said frame adapted to actuate said device when the flask sections are assembled.

81. In a molding machine, the combination of a frame, a pattern carrier movably mounted on said frame, a pattern plate adapted to be supported on said carrier, a flask comprising cope and drag sections movably mounted on said frame and adapted to be assembled with said pattern plate therebetween, means to fill and ram said flask sections including a vertically movable piston, and means to draw said pattern from said flask sections during a descent of said piston, said means including a vibrating device carried on said pattern carrier adapted to be actuated as the pattern plate is discharged upon said carrier.

82. A molding machine comprising, in combination, a main frame, a flask movably mounted on said frame, a drag board carrier on one side of said frame movable into and out of a position above said flask, and a cope board carrier on the other side of said frame movable into and out of a position above said flask.

83. In a molding machine comprising, in combination, a frame, a flask movably mounted on said frame, a sand hopper mounted vertically above said flask, a ramming device mounted vertically beneath said flask, a drag board carrier mounted on one side of said frame and movable into and out of a position immediately above the flask, a cope board carrier mounted on another side of said frame and movable into and out of a position above said flask, a cam mechanism positioned laterally of said main frame, and means connecting said cam mechanism with said parts adapted to actuate said parts during an operation of said cam mechanism.

84. In a molding machine comprising, in combination, an upright frame, a flask permanently mounted thereon, sand supply devices carried on said frame vertically above said flask arranged to discharge sand into the flask from above, a ramming device carried on said frame vertically beneath said flask and sand supply devices, operating mechanism on said frame for said parts, a cam mechanism disposed laterally of said upright frame, and means operable by said cam mechanism connected to and adapted to actuate the operating mechanism carried on said frame.

85. In a molding machine, the combination of a pivotal flask comprising cope and drag sections, power driven means to pivot said flask into a position wherein the drag section is uppermost and then into a position wherein the cope section is uppermost, and means automatically timed to discharge sand into said flask sections when uppermost.

86. In a molding machine, the combination of an invertible flask, a sand hopper supported above said flask, a discharge gate on said hopper, means adapted to invert and re-invert said flask, and means operable during each of said movements to open the discharge gate on said hopper.

87. In a molding machine, the combination of an invertible flask comprising cope and drag sections, a sand hopper, a discharge gate on said hopper, means to position said flask with the drag uppermost and the cope uppermost alternately, and means to actuate said gate to discharge sand into each of said sections when uppermost.

88. A molding machine comprising, in combination, a frame, a flask comprising cope and drag sections movably mounted on said frame, means to move said flask to place the drag uppermost, a support, a drag board on said support, means to move said drag board from said support onto said drag section, means to clamp the drag board to the drag section, and means to move said flask to position the cope uppermost.

89. A molding machine comprising, in combination, a main frame, a pattern plate detachably supported on said frame, a flask comprising cope and drag sections movably mounted on said frame and adapted to be assembled with said pattern plate therebetween, means operable to position first said drag section uppermost, and then said cope section uppermost, means operable to discharge sand into said drag section when uppermost, said means being again operable to discharge sand into said cope section when uppermost.

90. A molding machine comprising, in combination, a main frame, a pattern plate detachably supported on said frame, a flask comprising cope and drag sections movably mounted on said frame and adapted to be assembled with said pattern plate therebetween, means operable to position first said drag section uppermost and then said cope section uppermost, means to discharge said into said drag section when uppermost, a drag board, means to apply said drag board to said filled drag section, means to clamp said drag board to said drag section, said sand discharging means being again operable to discharge sand into said cope section when uppermost, a cope board movably mounted on said frame, and means to move said cope board into a position above said filled cope.

91. A molding machine comprising, in combination, a main frame, a pattern plate detachably supported on said frame, a flask comprising cope and drag sections movably mounted on said frame and adapted to be assembled with said pattern plate therebetween, means operable to position first said drag section uppermost and then said cope section uppermost, means to discharge sand into said drag section when uppermost, a drag board, means to apply said drag board to said filled drag section, means to clamp said drag board to said drag section, said sand discharging means being again operable to discharge sand into said cope section when uppermost, a cope board movably mounted on said frame, a ram supported beneath said flask, and means adapted to actuate said ram to ram said flask.

92. In a molding machine, the combination of a pivotal flask, and means to rotate said flask through 180°, said means comprising an arm rigid with said flask, a link connected to the free end of said arm, and a cam actuated rod connected to said link.

93. In a molding machine of the character described, the combination of a mold carrier adapted to receive a completed mold, a slidable support for the rear end of said carrier, a slidable support for the front end of said carrier, means to raise and lower said front support, and means to move said carrier forwardly and rearwardly of the machine.

94. In a molding machine of the character described, in combination, a mold carrier adapted to receive a completed mold for removal from the machine comprising a frame mounted to slide forwardly and rearwardly of said machine, and a pair of arms pivotally mounted at the front end of said frame, means to raise and lower the front end of said frame, and means to actuate said frame forwardly and rearwardly of the machine.

95. A molding machine comprising, in combination, a main frame, a flask comprising cope and drag sections permanently mounted on said frame for pivotal movement on an axis shiftable vertically, sand supply means including a distributing chute mounted immediately above said flask, a drag board support mounted to one side of the flask, a cope board permanently and movably mounted on said frame normally positioned to the opposite side of said flask, and a ramming device positioned beneath the flask.

96. A molding machine having, in combination, a main frame comprising a pair of spaced vertical standards, a flask permanently mounted on said frame intermediate said standards, a ramming device positioned beneath said flask, sand supply means including a measuring hopper positioned above the flask, a drag board supply hopper mounted in front of said frame adjacent the flask, and a cope board permanently mounted on said frame movable from a position above the flask rearwardly.

97. In a molding machine, the combination of a flask comprising a cope section, a cope board of a size adapted to enter one end of the cope section, and means to discharge compressed air about the edges of said board when the board is in the flask whereby to drive out loose sand.

98. In a molding machine, the combination of a pivotal flask comprising a cope section, a cope board arranged to be used successively in ramming a plurality of molds movable into and out of said cope section and adapted during a ramming operation to enter said section, said board being provided with a plurality of air nozzles about its periphery.

99. In a molding machine, the combination of a flask comprising cope and drag sections and a pattern plate therebetween, a cope board movable into and out of a position adjacent the cope section, means for separating the cope, drag and pattern plate, a vibrator supported with said cope board, and means for actuating said vibrator during a separating movement of said parts.

100. In a molding machine, the combination of a frame, a flask section pivotally mounted on said frame, bearings for said flask section, a plurality of bottom board clamps movably mounted on the flask section, and means to operate said clamps including a shaft extending axially through one of said bearings.

101. In a molding machine, the combination of a pivotal flask, a pivotally mounted frame for supporting said flask for a limited vertical movement, ramming means positioned in vertical alinement with the flask and means to retain said flask in vertical alinement during a pivotal movement of the flask supporting frame.

102. In a molding machine, the combination of a mold flask comprising separable and movable parts, power driven mechanism for operating said parts, sand supply means, and means actuated by movements of the flask for controlling said sand supply means.

103. In an automatic molding machine wherein a single pattern plate is used in forming a plurality of molds, a flask, means for moving the pattern plate into and out of operative relation with the flask, and means to clean said pattern plate when moved out of operative relation with the flask.

104. In a molding machine, the combination with means for ramming a flask and means for separating the cope, drag and pattern plate. of a vibrating device mounted independently of the pattern plate and arranged during a separating movement of said parts to rap the plate loose from the sand.

105. In a molding machine, the combination of a frame, a flask comprising movable parts permanently mounted on said frame, means for ramming a mold having members positioned above and below the flask and means operable during the forming of each mold arranged to clean the lower of said members.

106. In a molding machine, the combination of a flask section, a sand hopper positioned a substantial distance vertically above said flask section and a chute intermediate said hopper and said flask section having relatively narrow transversely extending vanes adjacent its lower end spaced inwardly from the edges thereof and inclined for directing sand during its descent to peen the sand along the edges of the flask.

107. In a molding machine comprising a flask, and sand supply means positioned above the flask, a chute intermediate said sand supply means and flask having inwardly and downwardly tapering sides, a plurality of vanes therein adapted to break up sand falling therethrough and a plurality of relatively narrow horizontally extending beveled vanes adjacent its lower edge arranged to project falling sand outwardly to peen sand along the edges of the flask.

108. In a molding machine having a flask comprising separable parts, one of which is arranged to move toward the other for the purpose of closing the mold after the pattern plate has been removed, the combination of a movable support for the then stationary part of the flask and means to counter-balance the weight of said support and flask part so as to avoid injuring the mold as the parts come together.

In testimony whereof, I have hereunto affixed my signature.

GEORGE E. PICKUP.